(12) United States Patent
Jaker et al.

(10) Patent No.: US 8,202,940 B2
(45) Date of Patent: Jun. 19, 2012

(54) BIMODAL POLYETHYLENE COMPOSITIONS FOR BLOW MOLDING APPLICATIONS

(75) Inventors: Stephen P. Jaker, Woodbridge, NJ (US); Sun-Chueh Kao, Pearland, TX (US); Dongming Li, Houston, TX (US); Daniel P. Zilker, Jr., Charleston, WV (US); Ching-Tai Lue, Sugar Land, TX (US)

(73) Assignee: Univation Technologies, LLC, Houston, TX (US)

( * ) Notice: Subject to any disclaimer, the term of this patent is extended or adjusted under 35 U.S.C. 154(b) by 28 days.

(21) Appl. No.: 12/624,046

(22) Filed: Nov. 23, 2009

(65) Prior Publication Data

US 2010/0133714 A1    Jun. 3, 2010

Related U.S. Application Data

(63) Continuation-in-part of application No. 12/152,502, filed on May 15, 2008, now Pat. No. 7,868,092.

(51) Int. Cl.
*C08F 8/00* (2006.01)
*C08L 23/04* (2006.01)
(52) U.S. Cl. ........................ 525/191; 525/240
(58) Field of Classification Search .................. 525/191, 525/240
See application file for complete search history.

(56) References Cited

U.S. PATENT DOCUMENTS

| | | | |
|---|---|---|---|
| 3,898,209 A | 8/1975 | Watson et al. | 528/481 |
| 4,029,877 A | 6/1977 | Yoshiura et al. | 528/483 |
| 4,115,107 A | 9/1978 | Booz et al. | 75/354 |
| 4,173,445 A | 11/1979 | McKelvey et al. | 425/382.4 |
| 4,302,565 A | 11/1981 | Goeke et al. | 526/88 |
| 4,414,364 A | 11/1983 | McAlister | 525/437 |
| 4,461,873 A | 7/1984 | Bailey et al. | 525/240 |
| 4,528,151 A | 7/1985 | Matsuo et al. | 264/83 |
| 4,547,551 A | 10/1985 | Bailey et al. | 525/240 |
| 4,814,135 A | 3/1989 | Heitz | 264/564 |
| 4,890,996 A | 1/1990 | Shimizu | 425/145 |
| 4,960,741 A | 10/1990 | Bailly et al. | 502/10 |
| 5,032,562 A | 7/1991 | Lo et al. | 502/111 |
| 5,143,976 A | 9/1992 | Ashihara et al. | 525/227 |
| 5,260,384 A | 11/1993 | Morimoto et al. | 525/240 |
| 5,284,613 A | 2/1994 | Ali et al. | 264/566 |
| 5,288,933 A | 2/1994 | Kao et al. | 585/513 |
| 5,302,638 A | 4/1994 | Ho et al. | 524/59 |
| 5,338,589 A | 8/1994 | Bohm et al. | |
| 5,352,749 A | 10/1994 | DeChellis et al. | 526/68 |
| 5,364,907 A | 11/1994 | Rolando et al. | 525/541 |
| 5,405,917 A | 4/1995 | Mueller et al. | 525/333.8 |
| 5,420,220 A | 5/1995 | Cheruvu et al. | |
| 5,458,474 A | 10/1995 | Neubauer et al. | 425/202 |
| 5,525,678 A | 6/1996 | Mink et al. | 525/246 |
| 5,539,076 A | 7/1996 | Nowlin et al. | 526/348.1 |
| 5,578,682 A | 11/1996 | White | 525/282 |
| 5,587,434 A | 12/1996 | McCullough et al. | 525/333.8 |
| 5,595,705 A | 1/1997 | Walton et al. | |
| 5,677,375 A | 10/1997 | Rifi et al. | 525/53 |
| 5,728,335 A | 3/1998 | Neubauer | 264/83 |
| 5,739,266 A | 4/1998 | Piana | 528/483 |
| 5,889,128 A | 3/1999 | Schrock et al. | 526/107 |
| 5,908,679 A | 6/1999 | Berthold et al. | 428/369 |
| 6,090,893 A | 7/2000 | Harlin et al. | |
| 6,147,167 A | 11/2000 | Mack et al. | 525/333.8 |
| 6,201,078 B1 | 3/2001 | Breulet et al. | 526/113 |
| 6,207,756 B1 | 3/2001 | Datta et al. | 525/191 |
| 6,242,543 B1 | 6/2001 | Follestad et al. | 526/118 |
| 6,248,840 B1 | 6/2001 | Sukhadia et al. | |
| 6,271,325 B1 | 8/2001 | McConville et al. | 526/217 |
| 6,444,605 B1 | 9/2002 | Job et al. | 502/113 |
| 6,454,976 B1 | 9/2002 | Neubauer | 264/85 |
| 6,472,484 B1 | 10/2002 | Abe et al. | 526/201 |
| 6,545,093 B1 | 4/2003 | De Lange et al. | 525/191 |
| 6,562,905 B1 | 5/2003 | Nummila et al. | 525/191 |
| 6,579,922 B2 | 6/2003 | Laurent | 524/240 |
| 6,605,675 B2 | 8/2003 | Mawson et al. | 526/115 |
| 6,608,149 B2 | 8/2003 | Mawson et al. | 526/60 |
| 6,642,313 B1 | 11/2003 | Kazakov et al. | 525/191 |
| 6,713,004 B2 | 3/2004 | Maekawa et al. | 264/102 |
| 6,878,454 B1 * | 4/2005 | Shannon et al. | 428/523 |
| 6,984,698 B2 | 1/2006 | McLeod et al. | 525/333.8 |
| 6,987,148 B2 | 1/2006 | Sodagudi et al. | 525/192 |
| 6,989,344 B2 | 1/2006 | Cann et al. | |
| 6,989,423 B2 | 1/2006 | Wagner et al. | |

(Continued)

FOREIGN PATENT DOCUMENTS

EP          0180444          5/1986
(Continued)

OTHER PUBLICATIONS

Berthold, J. et al. "Advanced Polymerisation process for tailor made pipe resins" PLAST., Rubber Compos. Process. Appl., pp. 368-372 (1996).

Böhm, L.L. et al., "The Industrial Synthesis of Bimodal Polyethylene Grades with Improved Properties" Hoechst AG, 65926 Frankfurt (M), Germany pp. 351-363 (1994).

Burkhardt, Ulrich et al., "Preparation of Polymers with Novel Properties" Dieter Voigt, Institute for Polymer Research Dresden, pp. 55-78 (1995). [German Document].

Davey, Chris, R., et al., "Engineered Catalyst for Controlled Bimodal Structures in Unipol Single Reactor Gas Phase Polyethylene," SPE-Polyolefins 2002 International Conference Feb. 25-27, 2002.

(Continued)

*Primary Examiner* — Nathan M Nutter

(57) ABSTRACT

Bimodal polyethylene compositions and methods for making the same are provided. In at least one specific embodiment, the bimodal polyethylene composition can include a high molecular weight component having a weight average molecular weight (Mw) of from about 400,000 to about 950,000. The bimodal polyethylene composition can also include a low molecular weight component having a weight average molecular weight (Mw) of from about 3,000 to about 100,000. The high molecular weight component can be present in an amount ranging from about 25 wt % to about 40 wt % of the bimodal polyethylene composition. The bimodal polyethylene composition can also have a percent die swell of less than about 80%.

10 Claims, 3 Drawing Sheets

U.S. PATENT DOCUMENTS

| | | | |
|---|---|---|---|
| 7,432,328 B2 | 10/2008 | Jaker | 525/191 |
| 7,858,702 B2 | 12/2010 | Jaker | |
| 7,868,092 B2 | 1/2011 | Kwalk et al. | |
| 2002/0014717 A1 | 2/2002 | Kling et al. | 264/171 |
| 2002/0091198 A1 | 7/2002 | Itoh et al. | 525/192 |
| 2002/0143123 A1 | 10/2002 | Dekmezian et al. | |
| 2003/0047831 A1 | 3/2003 | Witt et al. | 264/142 |
| 2003/0055170 A1 | 3/2003 | Guenther et al. | 525/192 |
| 2003/0055174 A1 | 3/2003 | Tsutsui et al. | 525/240 |
| 2003/0154859 A1 | 8/2003 | Simonaru et al. | 95/149 |
| 2003/0166774 A1 | 9/2003 | Hoshi et al. | 525/88 |
| 2004/0023601 A1 | 2/2004 | Mercuri | 451/51 |
| 2004/0039131 A1 | 2/2004 | Wagner et al. | 525/333.8 |
| 2004/0048736 A1 | 3/2004 | Mink et al. | 502/102 |
| 2004/0082722 A1 | 4/2004 | McLeod et al. | 525/192 |
| 2005/0009942 A1 | 1/2005 | Walton | 521/134 |
| 2005/0012235 A1 | 1/2005 | Schregenberger et al. | 264/83 |
| 2006/0038312 A1 | 2/2006 | Li et al. | |
| 2006/0038315 A1 | 2/2006 | Tunnell et al. | 264/210.3 |
| 2007/0073010 A1 | 3/2007 | Pannell et al. | 526/73 |
| 2010/0164133 A1 | 7/2010 | Schregenberger et al. | |

FOREIGN PATENT DOCUMENTS

| | | |
|---|---|---|
| EP | 0936049 | 8/1990 |
| EP | 0457441 | 4/1992 |
| EP | 0517868 | 12/1992 |
| EP | 0728796 | 2/1997 |
| EP | 0729387 | 6/1997 |
| EP | 1241188 | 9/2002 |
| GB | 1201060 | 8/1970 |
| JP | H11-071427 | 3/1999 |
| WO | WO 96/09328 | 3/1996 |
| WO | WO 99/01460 | 1/1999 |
| WO | WO 99/29737 | 6/1999 |
| WO | WO 03/047839 | 6/2003 |
| WO | WO 2004/005357 | 1/2004 |
| WO | WO 2004/101674 | 11/2004 |
| WO | WO 2005/061225 | 7/2005 |

OTHER PUBLICATIONS

Ebner, K., "Bi-Modal HDPE for Piping Systems and Further Applications" Adv. Plast. Technol. APT '97, Int. Conf., pp. 1-8 (1997).

Scheirs, John, et al., "PE100 Resins for Pipe Applications: Continuing the Development into the 21st Century" Trip vol. 4, No. 12, 408-415 (1996).

Yano, et al. "Homo- and copolymerization of ethylene by cationic hafnocene catalysts based on tetrakis (pentafluorophenyl) borate" Macromol. Chem. Phys. 200, No. 4, pp. 924-932 (1999).

Zabusky, H.H., et al. "Properties of High Density Polyethylene with Bimodal Molecular Weight Distribution" SPE Transactions, pp. 17-21 (1964).

* cited by examiner

BIMODAL POLYETHYLENE COMPOSITIONS FOR BLOW MOLDING APPLICATIONS

CROSS REFERENCE TO RELATED APPLICATION

This application is a continuation-in-part of U.S. patent application Ser. No. 12/152,502, filed on May 15, 2008, which is a continuation-in-part of U.S. patent application Ser. No. 11/152,536, filed on Jun. 14, 2005, and issued as U.S. Pat. No. 7,432,328. All of which are incorporated by reference herein.

This application is also a continuation-in-part of U.S. patent application Ser. No. 11/185,068, filed on Jul. 19, 2005, which claims the benefit of U.S. Provisional Application Ser. No. 60/602,936 filed on Aug. 19, 2004. All of which are incorporated by reference herein.

FIELD OF THE INVENTION

This disclosure generally relates to polyethylene compositions and, in particular, to high density bimodal polyethylene compositions suitable for blow molding applications and methods for producing same.

BACKGROUND OF THE INVENTION

Advances in polymerization and catalysis have produced new polymers having improved physical and mechanical properties useful in a wide variety of products and applications. High density bimodal polyethylene compositions, and in particular, high density "bimodal" or "multimodal" polyethylenes (bHDPE), are known to be useful for making a variety of commercial products such as films, pipes, and some blow molding products.

Despite their use in commercial products, high density polyethylene (HDPE) blow molding compositions and their corresponding industrial applications still desire improvements in elasticity (G'/G") and die swell. Consequently, HDPE has not typically been used for particular blow molding applications, such as bottles, where a reduced die swell is desired or required.

There is a need, therefore, for improved HDPE compositions and methods for making the same that exhibit improved blow molding properties including reduced die swell.

SUMMARY OF THE INVENTION

Bimodal polyethylene compositions and methods for the making same are provided. In one embodiment, the bimodal polyethylene composition can include a high molecular weight component having a weight average molecular weight (Mw) of from about 400,000 to about 950,000. The bimodal polyethylene composition can also include a low molecular weight component having a weight average molecular weight (Mw) of from about 3,000 to about 100,000. The high molecular weight component can be present in an amount ranging from about 25 wt % to about 40 wt % of the bimodal polyethylene composition. The bimodal polyethylene composition also can have a percent die swell of less than about 80%.

In one embodiment, a method for making the bimodal polyethylene composition can include heating a bimodal polyethylene to produce a substantially melted bimodal polyethylene. The substantially melted bimodal polyethylene can be contacted with a gas mixture comprising from about 8 vol % to about 20 vol % oxygen to produce an oxygen tailored bimodal polyethylene. The oxygen tailored bimodal polyethylene can be cooled to produce a bimodal polyethylene composition that includes a high molecular weight component having a weight average molecular weight (Mw) of from about 400,000 to about 950,000 and a low molecular weight component having a weight average molecular weight (Mw) of from about 3,000 to about 100,000. The high molecular weight component can be present in an amount ranging from about 25 wt % to about 40 wt % of the bimodal polyethylene composition. The bimodal polyethylene composition can have a percent die swell of less than about 80%.

In one embodiment, a method for making the bimodal polyethylene composition can include conveying a bimodal polyethylene through a mixer/extruder. The mixer/extruder can include a melt-conveying zone and the bimodal polyethylene can be substantially melted in the melt-conveying zone. The substantially melted polyethylene can be contacted with a gas mixture comprising from about 8 vol % oxygen to about 20 vol % oxygen within the melt-conveying zone to produce a bimodal polyethylene composition that includes a high molecular weight component having a weight average molecular weight (Mw) of from about 400,000 to about 950,000 and a low molecular weight component having a weight average molecular weight (Mw) of from about 3,000 to about 100,000. The high molecular weight component can be present in an amount ranging from about 25 wt % to about 40 wt % of the bimodal polyethylene composition. A ratio of the weight average molecular weight of the high molecular weight component to the weight average molecular weight of the low molecular weight component can range from about 15 to about 35. The bimodal polyethylene composition can have a percent die swell of less than about 80%.

DETAILED DESCRIPTION OF THE INVENTION

Figure 1:
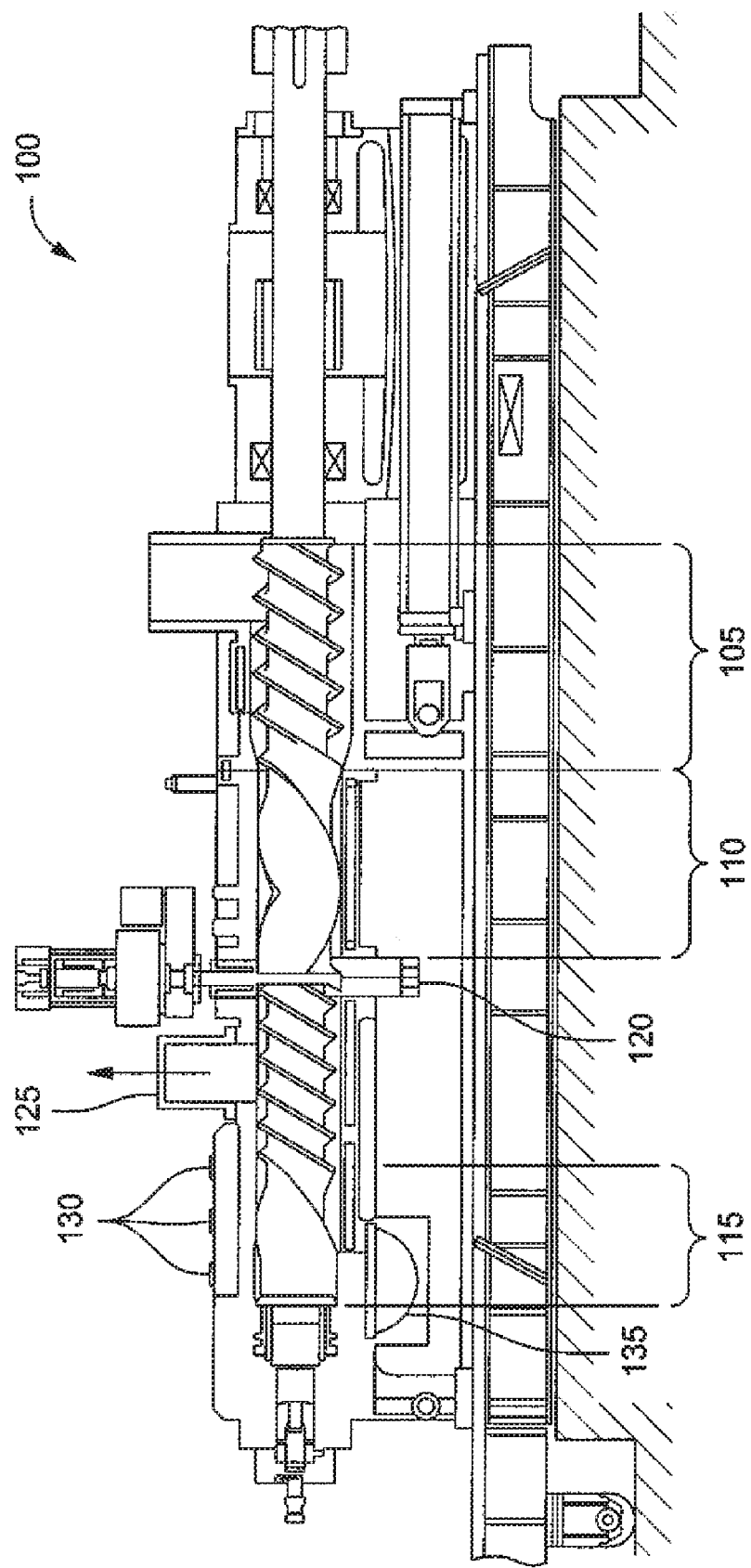
FIG. 1 depicts a schematic view of an illustrative Kobe mixer for making a tailored bimodal polyethylene composition.

Various specific embodiments, versions and examples of the invention will now be described, including preferred embodiments and definitions that are adopted herein for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The term "bimodal" refers to a polymer or polymer composition, e.g., polyethylene, having a "bimodal molecular weight distribution." A "bimodal" composition can include a polyethylene component with at least one identifiable higher molecular weight component and a polyethylene component with at least one identifiable lower molecular weight component, e.g., two distinct peaks on an SEC curve. A material with more than two different molecular weight distribution peaks will be considered "bimodal" as that term is used although the material may also be referred to as a "multimodal" composition, e.g., a trimodal or even tetramodal, etc. composition The term "polyethylene" refers to a polymer having at least 50 wt % ethylene-derived units, preferably at least 70 wt % ethylene-derived units, more preferably at least 80 wt % ethylene-derived units, or 90 wt % ethylene-derived units, or 95 wt % ethylene-derived units, or 100 wt % ethylene-derived units. The polyethylene can thus be a homopolymer or a copolymer, including a terpolymer, having one or more other monomeric units. A polyethylene described herein can, for example, include at least one or more other olefins) and/or comonomer(s). Suitable comonomers can contain 3 to 16 carbon atoms in one embodiment; from 3 to 12 carbon atoms in another embodiment; from 4 to 10 carbon atoms in another embodiment; and from 4 to 8 carbon atoms in yet another embodiment. Illustrative comonomers include, but are not limited to, propylene, 1-butene, 1-pentene, 1-hexene, 1-heptene, 1-octene, 4-methylpent-1-ene, 1-decene, 1-dodecene, 1-hexadecene and the like. Also utilizable herein are "polyene" comonomers such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene. Other embodiments may include ethacrylate or methacrylate.

The terms "high molecular weight polyethylene component," "high molecular weight component," and "HMWC" refer to the polyethylene component in the bimodal composition that has a higher molecular weight than the molecular weight of at least one other polyethylene component in the same composition. When the composition includes more than two components, e.g., a trimodal composition, then the high molecular weight component is to be defined as the component with the highest weight average molecular weight.

In one or more embodiments, the high molecular weight component can have a weight average molecular weight (Mw) of from about 400,000 to about 950,000. In one or more embodiments, the weight average molecular weight (Mw) of the high molecular weight polyethylene component can range from a low of about 450,000, about 500,000, about 600,000, about 650,000, or about 700,000 to a high of about 750,000, about 820,000, about 860,000, about 875,000, about 900,000, or about 925,000.

The terms "low molecular weight polyethylene component," "low molecular weight component," and "LMWC" refer to the polyethylene component in the composition that has a lower molecular weight than the molecular weight of at least one other polyethylene component in the same composition. When the composition includes more than two components, e.g., a trimodal composition, then the low molecular weight component is to be defined as the component with the lowest weight average molecular weight.

In one or more embodiments, the low molecular weight polyethylene component can have a weight average molecular weight (Mw) from about 3,000 to about 100,000. In one or more embodiments, the weight average molecular weight (Mw) of the low molecular weight polyethylene component can range from a low of about 3,000, about 5,000, about 10,000, about 15,000, about 20,000, or about 25,000 to a high of about 30,000, about 35,000, about 40,000, about 45,000, about 55,000, or about 65,000. In one or more embodiments, the weight average molecular weight (Mw) of the low molecular weight polyethylene component can range from about 25,000 to about 40,000, or about 26,000 to about 40,000, or about 27,000 to about 38,000, or about 28,000 to about 36,000, or about 30,000 to about 35,000.

The term "split" refers to the weight percent (wt %) of the high molecular weight polyethylene component in the bimodal composition. Thus, it describes the relative amount of the high molecular weight component against the low molecular weight component in a bimodal polyethylene composition, including any of the polymer compositions described herein. The weight percent (wt %) of each component can also be represented by the area of each molecular weight distribution curve that is seen after deconvolution of the overall molecular weight distribution curve.

In one or more embodiments, the split of the bimodal polyethylene composition can range from a low of about 25 wt %, about 30 wt %, or about 32 wt % to a high of about 38 wt %, about 40 wt %, or about 45 wt %. In one or more embodiments, the split of the bimodal polyethylene composition can range from about 31 wt % to about 40 wt %. In one or more embodiments, the split of the bimodal polyethylene composition can range from about 31 wt % to about 39 wt %, about 27 wt % to about 38 wt %, or about 32 wt % to about 39 wt %.

The term "spread" refers to the ratio of the weight average molecular weight of the high molecular weight component, sometimes referred to as $MW_{HMW}$, to the weight average molecular weight of the low molecular weight component, sometimes referred to as $MW_{LMW}$. The "spread" can therefore also be expressed as the ratio of $MW_{HMW}$:$MW_{LMW}$. The weight average molecular weight of each component can be obtained by deconvolution of an overall SEC curve, i.e. an SEC curve of an entire composition as discussed below.

In one or more embodiments, the spread of the bimodal polyethylene composition can range from a low of about 15, about 17, or about 19 to a high of about 30, about 32, or about 35. In one or more embodiments, the spread of the bimodal polyethylene composition ranges from a low of about 20, about 21, about 22, about 23, or about 24 to a high of about 27, about 28, about 29, about 30, or about 31. For example, the spread of the bimodal polyethylene composition can range from about 15 to about 35, or about 18 to about 33, or about 20 to about 31.

The number average (Mn), weight average (Mw), z-average (Mz), and Z+1 average (Mz+1) molecular weights are terms that refer to the molecular weight values for the entire composition (e.g., the blended composition), as opposed to that of any individual component, unless specifically noted otherwise. The number average, weight average, z-average, and z+1 average molecular weight values encompass any value as determined by any published method. A preferred method uses any published deconvolution procedure, e.g., any published technique for elucidating each individual polymer component's molecular information in a bimodal polymer. A particularly preferred technique uses a Flory deconvolution, including but not limited to the Flory procedures set forth in U.S. Pat. No. 6,534,604. Any program that incorporates the principles contained in the following reference is useful: P. J. Flory, Principles of Polymer Chemistry, Cornell University Press, New York 1953. Any computer program capable of fitting an experimental molecular weight distribution with multiple Flory or log-normal statistical distributions is useful. The Flory distribution can be expressed as follows:

$$Y = A_o \left(\frac{M}{M_n}\right)^2 e^{\left(-\frac{M}{M_n}\right)}$$

In this equation, Y is the weight fraction of polymer corresponding to the molecular species M, Mn is the number average molecular weight of the distribution, and $A_o$ is the weight fraction of the site generating the distribution. Y can be shown to be proportional to the differential molecular weight distribution (DMWD) which is the change in concentration with the change in log-molecular weight. The SEC chromatogram represents the DMWD. Any computer program that minimizes the square of the difference between the experimental and calculated distributions by varying the $A_o$ and Mn for each Flory distribution is preferred. Particularly preferred is any program that can handle up to 8 Flory distributions. A commercially available program, called Excel Solver, offered by Frontline Systems, Inc. at www.solver.com can be used to perform the minimization. Using this program, special constraints can be placed on the individual Flory distributions that allow one to fit chromatograms of experimental blends and bimodal distributions.

Bimodal distributions can be fit within two individual groups of four constrained Flory distributions, for a total of eight distributions. One constrained group of four fits the low molecular weight component while the other group fits the high molecular weight component. Each constrained group is characterized by $A_o$ and Mn of the lowest molecular weight component in the group and the ratios $A_o(n)/A_o(1)$ and $Mn(n)/Mn(1)$ for each of the other three distributions (n=2, 3, 4). Although the total number of degrees of freedom is the same for the constrained fit as for eight unconstrained Flory distributions, the presence of the constraint is needed to more accurately determine the contribution to the total chromatogram of the individual low molecular weight and high molecular weight components in a bimodal polymer. Once the fitting process is complete, the program will then calculate the molecular weight statistics and weight percents of the individual high and low molecular weight components.

In one or more embodiments, the bimodal polyethylene composition has a weight average molecular weight (Mw) of from about 150,000 to about 600,000. In one or more embodiments, the weight average molecular weight (Mw) of the bimodal polyethylene composition ranges from a low of about 200,000, about 225,000, about 250,000, or about 275,000 to a high of about 350,000, about 375,000, about 400,000, about 450,000, or about 500,000.

Preferably, the bimodal polyethylene composition has a z-average molecular weight (Mz) of about 1,500,000 Daltons or more. In one or more embodiments, the bimodal polyethylene composition has a z-average molecular weight (Mz) of about 1,750,000 Daltons or more. In one or more embodiments, the bimodal polyethylene composition has a z-average molecular weight (Mz) ranging from about 2,000,000 Daltons to about 3,500,000 Daltons. In one or more embodiments, the bimodal polyethylene composition has a z-average molecular weight (Mz) between about 1,800,000 Daltons and about 4,000,000 Daltons. In one or more embodiments, the bimodal polyethylene composition has a z-average molecular weight (Mz) between about 1,900,000 Daltons and about 3,000,000 Daltons. In one or more embodiments, the bimodal polyethylene composition has a z-average molecular weight (Mz) that ranges from a low of about 1,700,000, about 1,850,000, about 1,950,000, or about 2,150,000 to a high of about 2,500,000, about 2,900,000, about 3,100,000, about 3,300,000, or about 3,500,000.

In one or more embodiments, the bimodal polyethylene composition has a z+1-average molecular weight (Mz+1) of about 2,000,000 Daltons or more, about 3,000,000 Daltons or more, or about 4,000,000 Daltons or more. In one or more embodiments, the bimodal polyethylene composition has a z+1-average molecular weight (Mz+1) between about 2,000,000 Daltons and about 6,000,000 Daltons. In one or more embodiments, the bimodal polyethylene composition has a z+1-average molecular weight (Mz+1) between about 3,500,000 Daltons and about 5,500,000 Daltons. In one or more embodiments, the bimodal polyethylene composition has a z+1-average molecular weight (Mz+1) that ranges from a low of about 2,000,000, about 3,000,000, or about 4,000,000 Daltons to a high of about 4,500,000, about 5,500,000, about 6,000,000 Daltons.

The term "MWD" (molecular weight distribution) means the same thing as "PDI" (polydispersity index). The term "MWD" (PDI) is intended to have the broadest definition that persons in the pertinent art have given that term as reflected in one or more printed publications or issued patents. The MWD (PDI) is the ratio of weight-average molecular weight (Mw) to number-average molecular weight (Mn), i.e., Mw/Mn.

In one or more embodiments, the bimodal polyethylene composition can have an Mw/Mn ratio of less than about 50, preferably less than about 45, or 40, or 38, or 37, or 36, or 35. In one or more embodiments, the MWD of the bimodal polyethylene composition can range from a low of about 10, about 15, about 17, or about 20 to a high of about 30, about 35, about 39, or about 42. In one or more embodiments, the MWD of the bimodal polyethylene composition can range from about 20 to about 35, from about 22 to about 33, from about 24 to about 36, or from about 25 to about 35.

Density is a physical property of a composition and may be determined in accordance with ASTM D-792. Density can be expressed as grams per cubic centimeter (g/cm³) unless otherwise noted. In one or more embodiments, the bimodal polyethylene composition can have a density greater than 0.945 g/cm³ and up to about 0.970 g/cm³. In one or more embodiments, the bimodal polyethylene composition can have a density ranging from about 0.950 g/cm³ to about 0.970 g/cm³. In one or more embodiments, the bimodal polyethylene composition can have a density ranging from a low of about 0.953 g/cm³, about 0.954 g/cm³, about 0.956 g/cm³, or about 0.957 g/cm³ to a high of about 0.959 g/cm³, about 0.961 g/cm³, about 0.963 g/cm³, or about 0.965 g/cm³. For example, the bimodal polyethylene composition can have a density ranging from about 0.954 g/cm³ to about 0.964 g/cm³, or from about 0.955 g/cm³ to about 0.962 g/cm³.

In one or more embodiments, the bimodal polyethylene composition can have a flow index (FI) or ($I_{21}$) of at least 5 g/10 min and less than about 45 g/10 min. In one or more embodiments, the bimodal polyethylene composition can have an FI ranging from a low of about 15 g/10 min, about 20 g/10 min, or about 25 g/10 min to a high of about 35 g/10 min, about 40 g/10 min, or about 45 g/10 min. For example, the bimodal polyethylene composition can have an FI of from about 20 g/10 min to about 40 g/10 min, or from about 25 g/10 min to about 35 g/10 min, or from about 25 g/10 min to about 33 g/10 min. The FI ($I_{21}$) is measured in accordance with ASTM D-1238-F (at 190° C., 21.6 kg weight).

In one or more embodiments, the bimodal polyethylene composition has an MI ($I_2$) of at least 0.01 g/10 min. In one or more embodiments, the bimodal polyethylene composition can have an MI ranging from a low of about 0.03 g/10 min, or about 0.05 g/10 min to a high of about 0.25 g/10 min or 0.30 g/10 min. The MI ($I_2$) is measured in accordance with ASTM D-1238-E (at 190° C., 2.16 kg weight).

The term "MFR" or "$I_{21}/I_2$" as used herein refers to the ratio of $I_{21}$ to $I_2$ or FI to MI. In one or more embodiments, the bimodal polyethylene composition can have an MFR of about 200 or more. In one or more embodiments, the bimodal polyethylene composition can have an MFR ranging from about 200 to about 500, or about 225 to about 450, or about 250 to about 400. In one or more embodiments, the bimodal polyethylene composition can have an MFR ranging from a low of about 220, 240, or 260 to a high of about 320, 360, or 400. In one or more embodiments, the bimodal polyethylene composition can have an MFR of from about 250 to about 375, or about 265 to about 360, or about 220 to about 420.

In one or more embodiments, the bimodal polyethylene composition can have a percent die swell of less than about 85%, less than about 83%, less than about 80%, less than about 79%, less than about 78%, or less than about 77%. In one or more embodiments, the bimodal polyethylene composition can have a die swell greater than about 65%, about 67%, about 68%, or about 69%. In one or more embodiments, the bimodal polyethylene composition can have a percent die swell ranging from a low of about 65%, about 66%, or about 67% to a high of about 77%, about 78%, about 79%, or about 80%. For example, the bimodal polyethylene composition can have a percent die swell of greater than about 65% and less than about 80% or greater than about 68% and less than about 79%, or greater than about 69% and less than about 78%.

In one or more embodiments, the bimodal polyethylene composition can have an Environmental Stress Crack Resistance (ESCR) of at least 175 hours. ESCR is a measure of the resistance to mechanical failure. In one or more embodiments, the bimodal polyethylene composition can have an ESCR ranging from about 180 hours to about 240 hours. In one or more embodiments, the bimodal polyethylene composition can have an ESCR ranging from a low of about 180 hours, about 185 hours, about 190 hours, or about 195 hours to a high of about 210 hours, about 215 hours, about 220 hours, or about 230 hours. The Environmental Stress Crack Resistance (ESCR) test was performed in accordance with ASTM D-1693 Procedure B, reported as $F_{50}$ hours. ESCR measures the number of hours that 50% of the tested specimens exhibited stress cracks. The specific specimen dimensions were 38 mm×13 mm with a thickness of 1.90 mm.

In one or more embodiments, the bimodal polyethylene composition can have an elasticity (G'/G") of about 0.7 or more, about 0.8 or more, about 0.9 or more, about 1 or more, about 1.1 or more, about 1.2 or more, about 1.3 or more, or about 1.4 or more. For example, the elasticity (G'/G") can range from a low of about 0.8, about 0.9, or about 1 to a high of about 1.1, about 1.2, or about 1.3. In one or more embodiments, a tailored bimodal polyethylene composition can have an elasticity (G'/G") of at least 15%, at least 20%, at least 25%, at least 30%, at least 35%, at least 40%, at least 45%, at least 50%, at least 55%, at least 60%, at least 65%, at least 70%, at least 75%, or at least 80% greater than an elasticity (G'/G") of a polyethylene that has been extruded or mixed under similar conditions without oxygen tailoring. In one or more embodiments, the tailored bimodal polyethylene composition has an elasticity (G'/G") ranging from a low of about 15%, about 25%, about 40%, or about 50% to a high of about 60%, about 70%, about 80%, or about 85% greater than an elasticity (G'/G") of a polyethylene extruded or mixed under similar conditions without oxygen tailoring. By "similar conditions" it is intended that the extrusion rates, extruder zone temperatures, screw design and other parameters are generally the same, save for normal process fluctuations. The term "elasticity" refers to the ratio of G' to G" at a frequency of 0.1 s$^{-1}$, where G' and G" are the storage (or elastic) and loss (or viscous) moduli, respectively. G' and G" were measured according to ASTM D-4440-84. Measurements were made at 200° C. using a Rheometrics DSR500 dynamic stress oscillatory rheometer equipped with 25 mm parallel plates and an approximate 1.5 mm gap.

Tailoring

In at least one specific embodiment, the bimodal polyethylene compositions can be tailored. Tailoring is the result of a chemical reaction between the tailoring agent and the polymer, e.g., the bimodal polyethylene. Tailoring a bimodal polyethylene composition can modify or change one or more properties of the bimodal polyethylene composition. For example, tailoring a bimodal polyethylene can significantly reduce its die swell. Tailoring a bimodal polyethylene composition can also significantly increase elasticity (G'/G").

The term "non-tailored" is intended to mean a granular polyolefin mixed or extruded in such a way that the modification of its rheology is minimized. This minimization may be accomplished by excluding tailoring agents from the extruded/mixed granular resin, and/or extruding/mixing the polyolefin with a non-reactive gas or gas mixture such as nitrogen, and/or extruding/mixing the polyolefin with a high concentration of primary, and/or secondary antioxidants, and/or extruding/mixing the polyolefin at relatively low melt temperatures below, for example, 200° C. The term "non-tailored" is also intended to mean extruded/mixed in the substantial absence of a tailoring agent, where a nitrogen or non-reactive atmosphere is used instead. For example, if the tailoring agent is oxygen gas or an oxygen mixture, "non-tailored" means to extrude/mix in the substantial absence of oxygen gas or an oxygen mixture, where a nitrogen or non-reactive atmosphere is used instead. The term "substantial absence of oxygen" refers to less than 1%, or less than 0.5%, or less than 0.25%, or less than 0.1%, or less than 0.05%, percent by volume (vol %) oxygen, or oxygen containing gas such as air, are present in a given process or segment of a process.

Illustrative tailoring agents can include, but are not limited to, oxygen gas, i.e. $O_2$, oxygen containing gas, such as air, peroxides, other oxygen-containing compounds, free radical initiators, and/or other reactive agents. Illustrative free radical initiators can include, but are not limited to, Azo-compounds, such as 2,2'-Azo(2,4-dimethylpentanentrile) [Vazo 52]; 2,2'-Azobisisobutyronitrile [Vazo64]; 2,2'-Azobis-(2-methylbutyronitrile) [Vazo 67] and 1,1'-Azocyclohexanecarbonitrile [Vazo 88], each available from Dupont. Additional free radical initiators can include, but are not limited to, lauroyl peroxide; benzoyl peroxide; cyclohexanone peroxide; 1,1-Bis(tert-butylperoxy)-3,3,5-trimethylcyclohexane; tert-butylperoxy isopropyl carbonate; tert-butyl peracetate; 2,2-bis(tert-butylperoxy)butane; tert-butyl peroxybenzoate bis (1-(tert-butylperoxy)-1-methylethylcyclohexane; dicumyl peroxide 2,5-Bis(tert-butylperoxy)-2,5-dimethyl-3-hexyne; tert-butyl peroxide; 2,4-pentaneedione peroxide; and cumene hydroperoxide.

The tailoring, as measured by increases in elasticity and/or decreases in die swell, may be affected by the temperature of the polymer, residence time of the contact between the tailoring agent with the polymer, and the concentration of the tailoring agent. For example, the temperature can range from a low of about 200° C., about 210° C., or about 220° C. to a high of about 250° C., about 260° C., or about 270° C. The time of the contact between the tailoring agent and the polymer can range from a low of about 2 seconds, about 3 seconds, or about 4 seconds to a high of about 25 seconds, about 30 seconds, or about 35 seconds. The tailoring, as measured by increases in elasticity and/or decreases in die swell, may also be affected by the concentration of anti-tailoring agents, e.g. such as antioxidants and/or other stabilizing additives. In the case of tailoring agents, e.g., oxygen, where the relative solubility of oxygen in the polymer melt compared to the gas is low, most of the tailoring reaction occurs along the interface, so increasing the surface area of the interface can increase the extent of the tailoring. Any of these aforementioned variables may also be used to control the tailoring process.

The polymer resin can be processed in a mixer, such as a co-rotating or counter-rotating, intermeshing or non-intermeshing twin screw mixer or an extruder. Such mixers are well known in the art, and are commercially available from various sources, such as Coperion (Werner-Pfleiderer), Kobelco and Farrel. The resin is usually introduced by a hopper to a feeding zone of the mixer. One or more additives can optionally be added to the resin in the feeding zone. The optional additives that can be added to the polymer resin can include, but are not limited to, fillers, flame retardants, impact modifiers, lubricants, processing aids, slip agents, anti-oxidants, anti-ozonants, heat stabilizers, UV stabilizers, or any combination thereof. The temperature of the feeding zone is generally below the melting temperature of the polymer resin and is typically between 20° C. and 100° C., which can be maintained by cooling the mixer or extruder. The polymer can be compressed within the feeding zone and conveyed toward a melting zone. The temperature within the melting zone can be increased to a temperature sufficient to at least partially melt the polymer resin. Preferably, the temperature within the melting zone is sufficient to substantially melt all the polymer resin. By "substantially melt" it is intended that greater than 95 wt %, or greater than 97 wt %, or greater than 99 wt %, or 100 wt % of the polymer resin is melted. Each zone can be only partially filled. By "partially filled" it is intended that from about 10% to about 99% of the volume of any zone or zones is/are filled to such percentages by polymer resin and/or any additives.

Although the terms "mixer" and "extruder" are often used loosely and interchangeably, one skilled in the art will appreciate that mixers, such as the commercially available Kobe or Farrel mixers, operate at relatively low pressures, typically about 689 kPa (100 psi) or less, and the zones within the mixer are generally not completely filled with resin. In extruders, such as the commercially available Werner-Pfleiderer extruder, operations can be at higher pressures in at least some zones, depending on modular screw/barrel design for that zone and the percentage of the zone that is filled or substantially filled with the resin and/or resin and additives, and some of the various zones within the extruder can be generally completely filled with resin, and such zones will be generally at higher pressures.

FIG. 1 depicts a schematic view of an illustrative Kobe mixer for making tailored bimodal polyethylenes, according to one or more embodiments. The mixer 100 can include a feed zone 105, a melting zone 110, and a melt-conveying zone 115. Resin and optional additives can be added to the mixer 100 in the feed zone 105, and the resin can be conveyed in a downstream direction through the melting zone 110 and the melt-conveying zone 115. A gate 120 can separate the melting zone 110 from the melt-conveying zone 115. Optional vents 125 and tailoring agent injection ports 130 are shown in FIG. 1 in the melt-conveying zone 115. As described above, the resin can be at least partially melted in melting zone 110, and substantially melted in melt-conveying zone 115. The resin can be conveyed through a mixer discharge 135 and further processed, such as by pelletizing. The pelletized resin can be further processed. For example, the pelletized resin can be formed into a blow molded article, an injection molded article, or the like.

Figure 2:
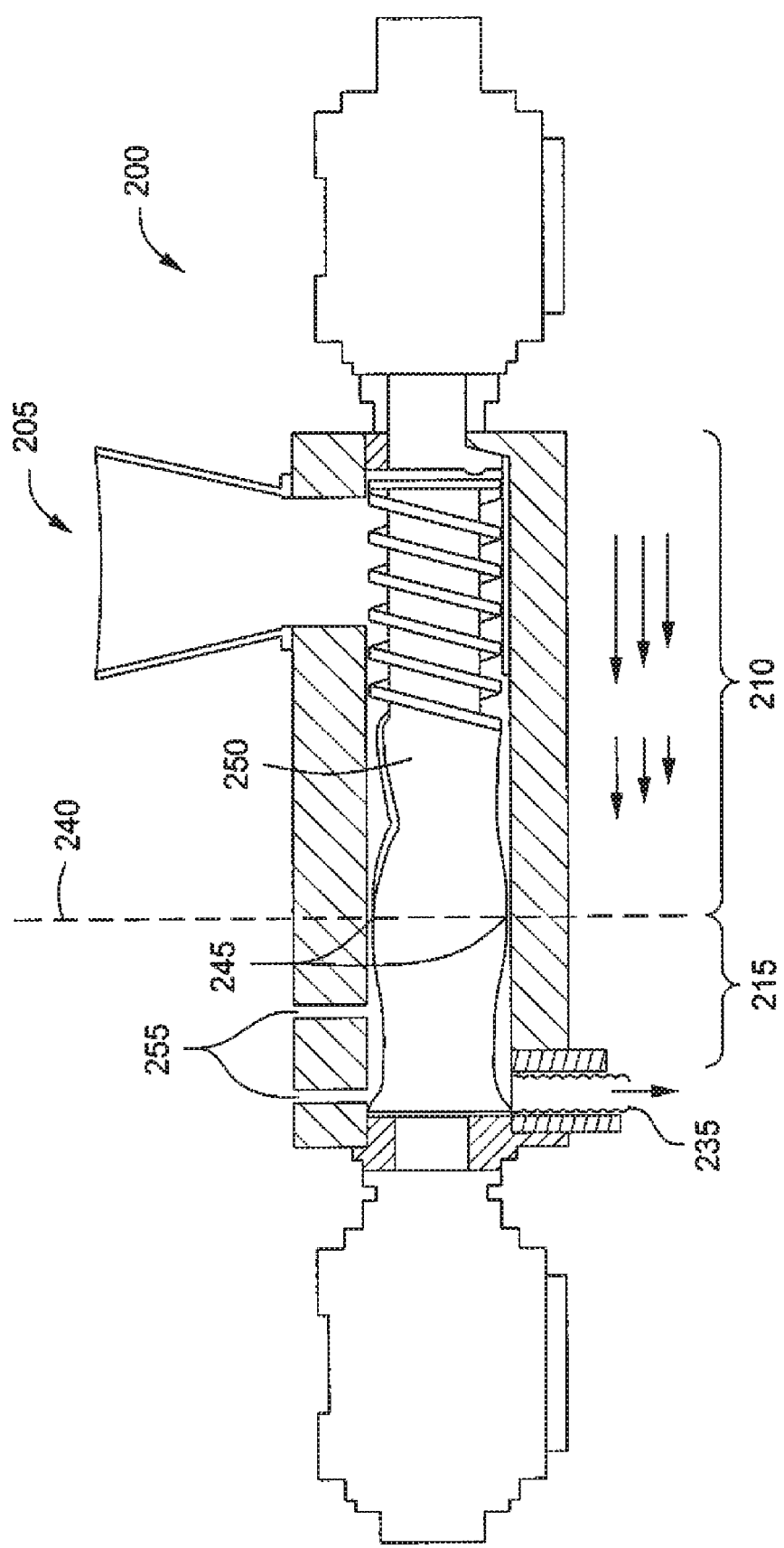
FIG. 2 depicts a schematic view of an illustrative Farrel mixer for making a tailored bimodal polyethylene composition.

FIG. 2 depicts a schematic view of an illustrative Farrel mixer 200 for making tailored bimodal polyethylenes, according to one or more embodiments. The mixer 200 can include a feed zone 205, a melting zone 210, and a melt-conveying zone 215. Resin and optional additives can be added to the mixer 200 in the feed zone 205, and the resin can be conveyed in a downstream direction through the melting zone 210 and the melt-conveying zone 215. As described above, the resin can be at least partially melted in melting zone 210, and substantially melted in melt-conveying zone 215. The resin can be conveyed through a mixer discharge 235 and further processed, such as by pelletizing or pelletizing and then blow molding. The Farrel mixer does not have a gate such as gate 120 of the Kobe mixer separating the melting zone from the melt-conveying zone, discussed and described above with reference to FIG. 1. However, in the Farrel mixer the melting zone 210 and the melt-conveying zone 215 are effectively separated by a narrow clearance region shown by dashed line 240 corresponding to the apex 245 of a mixing element 250. An optional dam (not shown) can be inserted between melting zone 210 and melt-conveying zone 215 at the position of the dashed line 240. Optional vent or tailoring agent injection ports 255 are shown in FIG. 2 in the melt-conveying zone 215.

Figure 3:
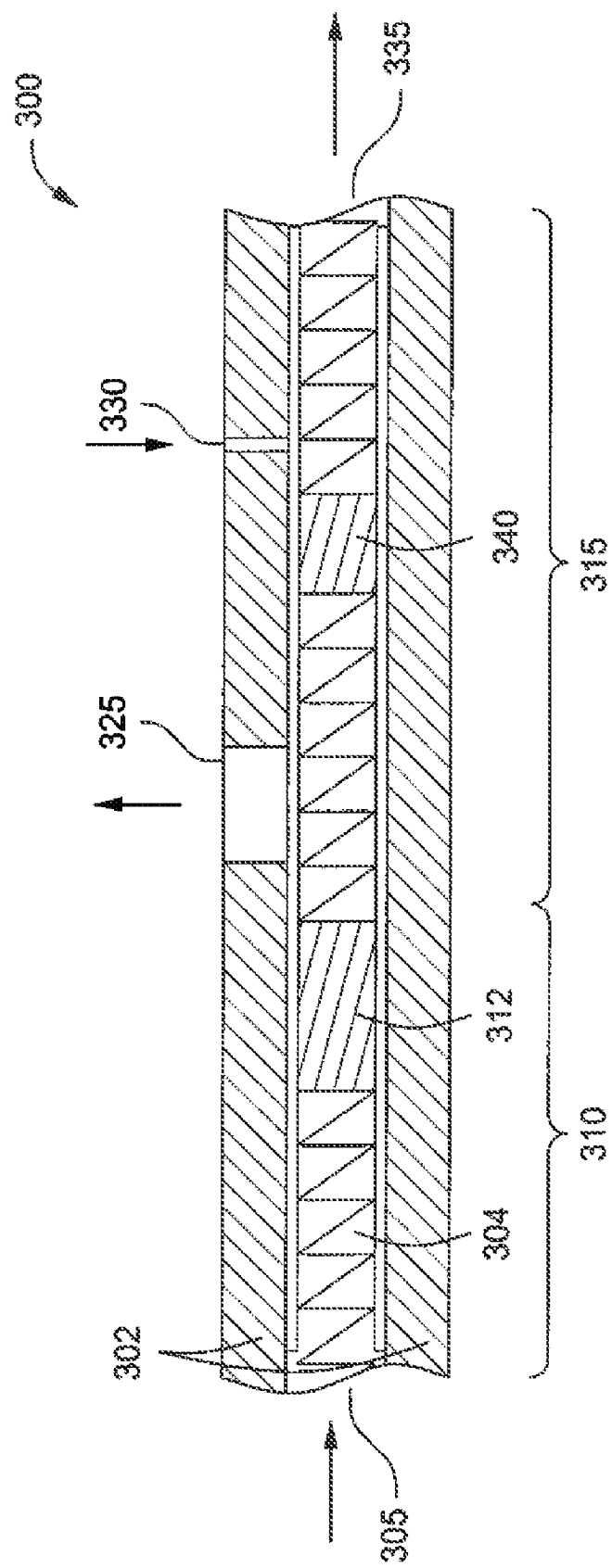
FIG. 3 depicts a schematic view of an illustrative processing section of a Werner-Pfleiderer extruder having a melting zone and a melt-conveying zone for making a tailored bimodal polyethylene composition.

FIG. 3 depicts a schematic view of an illustrative processing section 300 of a Werner-Pfleiderer extruder having a melting zone 310 and a melt-conveying zone 315 for making tailored polyethylene compositions, according to one or more embodiments. The processing section 300 can include a barrel or barrels 302, and screw or screws 304. The barrel(s) 302 and/or the screw(s) 304 can be or include positive conveying elements, non-conveying elements, and reverse-conveying elements. The polymer resin (polyethylene) in either granule or pellet form, and optional additives are fed to the processing section 300 and conveyed from a feed zone 305 to a discharge 335. The processing section 300 can be divided into a melting zone 310 and a melt-conveying zone 315 by a dam element 312. The melting zone 310 can be created by kneading and reverse conveying elements of the screw(s) 304. The polymer resin (polyethylene) can be contacted with the tailoring agent in the melt-conveying zone (only), by either an open vent port 325 or by injecting the tailoring agent from injection port 330, in this latter case the tailoring agent will flow upstream against or counter to the melted polyethylene being conveyed from left to right, in which case the tailoring agent exits at the open vent port 325. Alternatively, the injection port 330 can be placed upstream to the vent port 325 and the tailoring agent can be injected in the injection port 330, which can co-flow with molten resin, and exit from the open vent port 325. The practical effect of either flow model can be longer residence/contact time than simple contact at a vent port 325. Additionally, special elements 340 can be placed between the injection port 330 and the open vent port 325 to increase the interface for tailoring agent contact and to increase local residence time of the molten resin. The tailoring agent can also contact the molten resin via a single port, where both entry and exit of the gas takes place from the same port. More than one "single port" may be used.

In one or more embodiments, the feed zones 105, 205, and/or 305, melting zones 110, 210, and/or 310 can be substantially free of intentionally added tailoring agent, e.g. oxygen or an oxygen-gas mixture. By "substantially free of intentionally added tailoring agent" it is intended that less than about 2 vol %, or less than about 1 vol %, or less than about 0.5 vol % of tailoring agent can be present within any one or more of the feed zones 105, 205, 305 and melting zones 110, 210, 310, the volume being the volume of the zones. For example, if the tailoring agent is oxygen gas, the term "substantially free of intentionally added oxygen gas" would mean that less than about 2 vol %, or less than about 1 vol %, or less than about 0.5 vol % of oxygen gas is present within any one or more of the feed zones 105, 205, 305 and melting zones 110, 210, 310, with the balance containing a non-tailoring agent(s), such as nitrogen, argon, and helium. In one or more embodiments, the tailoring agent can be introduced to the feed zones 105, 205, and/or 305. In one or more embodiments, the tailoring agent can be introduced to multiple locations within the mixers 100, 200, and/or 300. For example, the tailoring agent can be introduced to both the feed zone 105 and downstream of the gate 120 for the Kobe mixer 100.

The resin can be processed at a melt temperature of from about 93° C. (200° F.), or about 115° C. (239° F.), or about 125° C. (257° F.), or about 140° C. (284° F.), or about 150° C. (302° F.), or about 175° C. (347° F.), or about 200° C. (392° F.) to about 280° C. (536° F.), or about 270° C. (518° F.), or about 260° C. (500° F.), or about 230° C. (446° F.), or about 215° C. (419° F.), or about 210° C. (410° F.), or about 205° C. (401° F.). The melt temperature refers to the temperature of the melted polymer at the downstream end of the melting zone. For example, in FIG. 1, the melt temperature can be the temperature at gate 120; in FIG. 2, the melt temperature can be the temperature at the apex 245; and in FIG. 3 the melt temperature can be the temperature at the discharge 335 of the processing section 300 after the last barrel 302. Once such a polymer has transitioned from a solid, non-melted state, the temperature of the melted polymer/polyethylene can continue to rise. No matter the actual temperature, the melt temperature can be understood to be the temperature of the polymer at least at its melting point or above.

It should be appreciated that mixers and/or extruders other than those discussed and illustrated herein can be used. Suitable mixers or extruders preferably have a melt conveying zone that will allow the introduction of the tailoring agent.

The polymer resin can be contacted with the tailoring agent mixture in the melt-conveying zone. The tailoring agent may be provided, for example, through one or more gas inlet ports. Referring to FIG. 1, for example, the tailoring agent can be provided through the one or more inlets 130 and/or the feed zone 105. Referring to FIG. 2, for example, the tailoring agent can be provided through the one or more inlets 255. Referring to FIG. 3, for example, the tailoring agent can be provided through the one or more inlets 330. It should be appreciated that these specific inlet positions are merely exemplary.

The tailoring agent can be introduced as a continuous flow of gas or liquid. The tailoring agent can also be introduced intermittently. In one or more embodiments, the tailoring agent can be introduced into the extruder/mixer barrel at a location upstream a vent port. The tailoring agent can flow counter to the molten polymer resin or the gas can flow with the molten polymer.

In one or more embodiments, the tailoring agent can be oxygen gas, which can be provided as an essentially pure gas or as part of a gas mixture. The oxygen can be provided in a pre-mixed gas mixture, or co-fed to the extruder with a diluent gas. The amount of oxygen in a gas mixture can be adjusted by controlling the relative oxygen/diluent gas flow rates. For example, oxygen and nitrogen can be fed to the extruder at separately metered flow rates to provide oxygen to the extruder at the desired concentration. Oxygen content of the gas stream can be varied to control the level of tailoring or effect upon the polymer resin. In one or more embodiments, the oxygen concentration in the gas stream can range of from about 8 vol % to about 30 vol %. In one or more embodiments, the oxygen concentration in the gas stream can range from a low of about 8 vol %, about 9 vol %, or about 10 vol % to a high of about 15 vol %, about 20 vol %, or about 25 vol %. In one or more embodiments, the oxygen concentration can range from about 9.5 vol % to about 11 vol %, or about 9 vol % to about 12 vol %, or about 8.5 vol % to about 12.5 vol %. In one or more embodiments, air can be introduced to the mixer or extruder.

The remainder of the gas mixture can be any non-flammable gas or gas mixture, such as nitrogen, argon, helium, neon, krypton, xenon, carbon dioxide, or mixtures thereof. After the oxygen treatment, or "tailoring", the resin can be extruded through a die and pelletized and cooled, or can be directly extruded without pelletization to form a film, such as by a cast or blown film process.

Tailoring can be influenced by additives such as anti-oxidants and/or anti-ozonants, such as phosphites and/or phosphonites. The more of such additives present in the polymer, the lower the amount and effect of tailoring for a given temperature, oxygen content and/or residence time. Such additives may be present in the polyethylene resin at a lower level of from about 0 parts per million (ppm), or 2 ppm, or 5 ppm, or 10 ppm, or 20 ppm, or 30 ppm, or 40 ppm to an upper limit of from about 3,000 ppm, or 2,500 ppm, or 2,000 ppm, or 1,500 ppm, or 1,000 ppm, or 750 ppm, or 500 ppm, or 400 ppm, or 300 ppm, or 200 ppm, or 100 ppm, based on the amount of polyethylene resin.

In one or more embodiments, the amount of phosphite present during the oxygen tailoring can be less than about 0.05 wt %, about 0.04 wt %, about 0.03 wt %, about 0.02 wt %, about 0.01 wt %, about 0.007 wt %, about 0.005 wt %, about 0.002 wt %, about 0.0005 wt %, or about 0.0001 wt %, based on the combined weight of the polyethylene resin and phosphite. In one or more embodiments, the amount of phosphonite present during the oxygen tailoring can be less than about 0.05 wt %, about 0.04 wt %, about 0.03 wt %, about 0.02 wt %, about 0.01 wt %, about 0.007 wt %, about 0.005 wt %, about 0.002 wt %, about 0.0005 wt %, or about 0.0001 wt %, based on the combined weight of the polyethylene resin and phosphonite. In one or more embodiments, the combined amount of phosphite and phosphonite present during the oxygen tailoring can be less than about 0.05 wt %, about 0.04 wt %, about 0.03 wt %, about 0.02 wt %, about 0.01 wt %, about 0.007 wt %, about 0.005 wt %, about 0.002 wt %, about 0.0005 wt %, or about 0.0001 wt %, based on the combined weight of the polyethylene resin, phosphite, and phosphonite. In one or more embodiments, the amount of any phosphorus based or phosphorus containing compound present during the oxygen tailoring can be less than about 0.05 wt %, about 0.04 wt %, about 0.03 wt %, about 0.02 wt %, about 0.01 wt %, about 0.007 wt %, about 0.005 wt %, about 0.002 wt %, about 0.0005 wt %, or about 0.0001 wt %, based on the combined weight of the polyethylene resin and phosphorus containing compounds.

Polymerization Process

The polymerization process used to form any of the polymer components can include, but are not limited to, high pressure, solution, slurry, and/or gas phase processes. Preferably, any one or more of the polyethylene components are polymerized by a continuous gas phase process utilizing a fluidized bed reactor. A fluidized bed reactor can include a reaction zone and a so-called velocity reduction zone. The reaction zone can include a bed of growing polymer particles, formed polymer particles and a minor amount of catalyst particles fluidized by the continuous flow of the gaseous monomer and diluent to remove heat of polymerization through the reaction zone. Optionally, some of the re-circulated gases may be cooled and compressed to form liquids that increase the heat removal capacity of the circulating gas stream when readmitted to the reaction zone. A suitable rate of gas flow may be readily determined by simple experiment. Make up of gaseous monomer to the circulating gas stream can be at a rate equal to the rate at which particulate polymer product and monomer associated therewith can be withdrawn from the reactor and the composition of the gas passing through the reactor can be adjusted to maintain an essentially steady state gaseous composition within the reaction zone. The gas leaving the reaction zone can be passed to the velocity reduction zone where entrained particles are removed. Finer entrained particles and dust may be removed in a cyclone and/or fine filter. The gas can be passed through a heat exchanger where the heat of polymerization can be removed, compressed in a compressor, and then returned to the reaction zone. Additional reactor details and means for operating the reactor are described in, for example, U.S. Pat. Nos. 3,709,853; 4,003,712; 4,011,382; 4,302,566; 4,543,399; 4,882,400; 5,352,749; and 5,541,270; EP 0802202; and Belgian Patent No. 839,380.

The reactor temperature of the fluid bed process can range from 30° C. or 40° C. or 50° C. to 90° C. or 100° C. or 110° C. or 120° C. or 150° C. In general, the reactor temperature can be operated at the highest temperature that can be feasible taking into account the sintering temperature of the polymer product within the reactor. Regardless of the process used to make the polyolefins, e.g., bimodal polyethylene, the polymerization temperature or reaction temperature should be below the melting or "sintering" temperature of the polymer to be formed. Thus, the upper temperature limit in one embodiment is the melting temperature of the polyolefin produced in the reactor.

Hydrogen gas can be often used in olefin polymerization to control the final properties of the polyolefin, such as described in "Polypropylene Handbook," at pages 76-78 (Hanser Publishers, 1996). Using certain catalyst systems, increasing concentrations (partial pressures) of hydrogen can increase the melt flow rate (MFR) (also referred to herein as melt index (MI)) of the polyolefin generated. The MFR or MI can thus be influenced by the hydrogen concentration. The amount of hydrogen in the polymerization can be expressed as a mole ratio relative to the total polymerizable monomer, for example, ethylene, or a blend of ethylene and hexane or propylene. The amount of hydrogen used in the polymerization process can be an amount necessary to achieve the desired MFR or MI of the final polyolefin resin. In one embodiment, the mole ratio of hydrogen to total monomer ($H_2$:monomer) can be in a range from greater than 0.0001 in one embodiment, and from greater than 0.0005 in another embodiment, and from greater than 0.001 in yet another embodiment, and less than 10 in yet another embodiment, and less than 5 in yet another embodiment, and less than 3 in yet another embodiment, and less than 0.10 in yet another embodiment, wherein a desirable range can include any combination of any upper mole ratio limit with any lower mole ratio limit described herein. Expressed another way, the amount of hydrogen in the reactor at any time may range to up to 5,000 ppm, and up to 4,000 ppm in another embodiment, and up to 3,000 ppm in yet another embodiment, and between 50 ppm and 5,000 ppm in yet another embodiment, and between 500 ppm and 2,000 ppm in another embodiment.

The one or more reactor pressures in a gas phase process (either single stage or two or more stages) may vary from 690 kPa (100 psig) to 3,448 kPa (500 psig), and in the range from 1,379 kPa (200 psig) to 2,759 kPa (400 psig) in another embodiment, and in the range from 1,724 kPa (250 psig) to 2,414 kPa (350 psig) in yet another embodiment.

In one or more embodiments, a staged reactor employing two or more reactors in series, where one reactor may produce, for example, a high molecular weight component and another reactor may produce a low molecular weight component can be used. In one or more embodiments, the polyolefin can be produced using a staged gas phase reactor. Such commercial polymerization systems are described in, for example, "Volume 2, Metallocene-Based Polyolefins," at pages 366-378 (John Scheirs & W. Kaminsky, eds. John Wiley & Sons, Ltd. 2000); U.S. Pat. Nos. 5,665,818; 5,677,375; and 6,472,484; and EP 0 517 868 and EP 0 794 200.

Process for Making the Bimodal Composition

Various different types of processes, and reactor configurations, can be used to produce the bimodal polyethylene composition, including melt blending, series reactors (i.e., sequentially-configured reactors) and single reactors using a mixed catalyst system. The bimodal composition, for example, can be a reactor blend (also sometimes referred to as a chemical blend). A reactor blend can be a blend that is formed (polymerized) in a single reactor, e.g., using a mixed catalyst system. The bimodal composition can also be a physical blend, e.g., a composition formed by the post-polymerization blending or mixing together of two or more polymer components, i.e., at least one HMWC and at least one LMWC, where each of the polymer components can be polymerized using the same or different catalyst systems.

Catalyst Systems

The term "catalyst system" includes at least one "catalyst compound" and at least one "activator," or alternately at least one cocatalyst. The catalyst system can also include other components, such as supports and/or co-catalysts, and is not limited to the catalyst component and/or activator alone or in combination. The catalyst system can include any number of catalyst components in any combination, as well as any activator in any combination.

The term "catalyst compound" includes any compound that, once appropriately activated, is capable of catalyzing the polymerization or oligomerization of olefins. Preferably, the catalyst component includes at least one Group 3 to Group 12 atom and optionally at least one leaving group bound thereto, includes any compound that, once appropriately activated, is capable of catalyzing the polymerization or oligomerization of olefins. Preferably, the catalyst compound includes at least one Group 3 to Group 12 atom and optionally at least one leaving group bound thereto.

The term "leaving group" refers to one or more chemical moieties bound to the metal center of the catalyst component that can be abstracted from the catalyst component by an activator, thereby producing the species active towards olefin polymerization or oligomerization. Suitable activators are described in detail below.

All reference to the Periodic Table of the Elements herein shall refer to the Periodic Table of the Elements, published and copyrighted by the International Union of Pure and Applied Chemistry, Inc. (IUPAC), 2004. Also, any reference to a Group or Groups shall be to the Group or Groups as reflected in this Periodic Table of the Elements using the IUPAC system for numbering groups.

The term "substituted" means that the group following that term possesses at least one moiety in place of one or more hydrogen atoms in any position, the moieties selected from such groups as halogen radicals (for example, Cl, F, Br), hydroxyl groups, carbonyl groups, carboxyl groups, amine groups, phosphine groups, alkoxy groups, phenyl groups, naphthyl groups, $C_1$ to $C_{10}$ alkyl groups, $C_2$ to $C_{10}$ alkenyl groups, and combinations thereof. Examples of substituted alkyls and aryls includes, but are not limited to, acyl radicals, alkylamino radicals, alkoxy radicals, aryloxy radicals, alkylthio radicals, dialkylamino radicals, alkoxycarbonyl radicals, aryloxycarbonyl radicals, carbamoyl radicals, alkyl- and dialkyl-carbamoyl radicals, acyloxy radicals, acylamino radicals, arylamino radicals, and combinations thereof.

Catalyst compounds include, but are not limited to, Ziegler-Natta catalysts, chromium-based catalysts, metallocene catalysts, Group 15-containing catalysts, and other single-site catalysts, and bimetallic catalysts. The catalyst or catalyst system can also include $AlCl_3$, cobalt, iron, and/or palladium. Any catalyst can be used alone or in combination with the others.

Conventional-Type Transition Metal Catalysts

Conventional-type transition metal catalysts may be traditional Ziegler-Natta catalysts. Examples of conventional-type transition metal catalysts are disclosed in U.S. Pat. Nos. 4,115,639; 4,077,904; 4,482,687; 4,564,605; 4,721,763; 4,879,359; and 4,960,741. The conventional-type transition metal catalyst compounds that may be used include, but are not limited to, transition metal compounds from Groups III to VIII of the Periodic Table of the Elements.

These conventional-type transition metal catalysts may be represented by the formula: $MR_x$, where M is a metal from Groups IIIB to VIII, preferably Group IVB, more preferably titanium; R is a halogen or a hydrocarbyloxy group; and x is the valence of the metal M. Non-limiting examples of R can include alkoxy, phenoxy, bromide, chloride and fluoride. Conventional-type transition metal catalysts where M is titanium can include, but are not limited to, $TiCl_4$, $TiBr_4$, $Ti(OC_2H_5)_3Cl$, $Ti(OC_2H_5)Cl_3$, $Ti(OC_4H_9)_3Cl$, $Ti(OC_3H_2)_2Cl_2$, $Ti(OC_2H_5)_2Br_2$, $TiCl_{3.1}/3AlCl_3$ and $Ti(OC_{12}H_{25})Cl_3$.

The conventional-type transition metal catalyst compounds disclosed herein may be activated with one or more of the conventional-type cocatalysts described below.

Conventional-Type Cocatalysts

Conventional-type cocatalyst compounds for the above conventional-type transition metal catalyst compounds can be represented by the formula $M^3M^4_vX^2_cR^3_{b-c}$, wherein $M^3$ is a metal from Group IA, IIA, IIB and IIIA of the Periodic Table of Elements; $M^4$ is a metal of Group IA of the Periodic Table of Elements; v is a number from 0 to 1; each $X^2$ is any halogen; c is a number from 0 to 3; each $R^3$ is a monovalent hydrocarbon radical or hydrogen; b is a number from 1 to 4; and wherein b minus c is at least 1. Other conventional-type organometallic cocatalyst compounds for the above conventional-type transition metal catalysts have the formula $M^3R^3_k$, where $M^3$ is a Group IA, IIA, IIB or IIIA metal, such as lithium, sodium, beryllium, barium, boron, aluminum, zinc, cadmium, and gallium; k equals 1, 2 or 3 depending upon the valency of $M^3$ which valency in turn normally depends upon the particular Group to which $M^3$ belongs; and each $R^3$ may be any monovalent hydrocarbon radical.

Examples of conventional-type organometallic cocatalyst compounds of Group IA, IIA and IIIA useful with the conventional-type catalyst compounds described above include, but are not limited to, methyllithium, butyllithium, dihexylmercury, butylmagnesium, diethylcadmium, benzylpotassium, diethylzinc, tri-n-butylaluminum, diisobutyl ethylboron, diethylcadmium, di-n-butylzinc and tri-n-amylboron, and, in particular, the aluminum alkyls, such as tri-hexylaluminum, triethylaluminum, trimethylaluminum, and tri-isobutylaluminum. Other conventional-type cocatalyst compounds may include mono-organohalides and hydrides of Group IIA metals, and mono- or di-organohalides and hydrides of Group IIIA metals. Non-limiting examples of such conventional-type cocatalyst compounds can include di-isobutylaluminum bromide, isobutylboron dichloride, methyl magnesium chloride, ethylberyllium chloride, ethylcalcium bromide, di-isobutylaluminum hydride, methylcadmium hydride, diethylboron hydride, hexylberyllium hydride, dipropylboron hydride, octylmagnesium hydride, butylzinc hydride, dichloroboron hydride, di-bromo-aluminum hydride and bromocadmium hydride. Conventional-type organometallic cocatalyst compounds can be as discussed and described in U.S. Pat. Nos. 3,221,002 and 5,093,415.

Metallocene Catalysts

Generally, metallocene catalyst compounds can include one or more ligands including cyclopentadienyl (Cp) or cyclopentadienyl-type structures or other similar functioning structure such as pentadiene, cyclooctatetraendiyl and imides. It is understood by one of skill in the art that references made herein to metallocene catalyst compounds and/or systems may also refer to metallocene-type catalyst compounds and/or systems. Typical metallocene compounds are generally described as containing one or more ligands capable of η-5 bonding to a transition metal atom, usually, cyclopentadienyl derived ligands or moieties, in combination with a transition metal selected from Group 3 to 8, preferably 4, 5, or 6 or from the lanthanide and actinide series of the Periodic Table of Elements. Illustrative metallocene catalyst compounds and catalyst systems are described in, for example, U.S. Pat. Nos. 4,530,914; 4,871,705; 4,937,299; 5,017,714; 5,055,438; 5,096,867; 5,120,867; 5,124,418; 5,198,401; 5,210,352; 5,229,478; 5,264,405; 5,278,264; 5,278,119; 5,304,614; 5,324,800; 5,347,025; 5,350,723; 5,384,299; 5,391,790; 5,391,789; 5,399,636; 5,408,017; 5,491,207; 5,455,366; 5,534,473; 5,539,124; 5,554,775; 5,621,126; 5,684,098; 5,693,730; 5,698,634; 5,710,297; 5,712,354; 5,714,427; 5,714,555; 5,728,641; 5,728,839; 5,753,577; 5,767,209; 5,770,753; and 5,770,664; European Publications EP 0 591 756; EP 0 520 732; EP 0 420 436; EP 0 485 822; EP 0 485 823; EP 0 743 324; and EP 0 518 092; and PCT Publications WO 91/04257; WO 92/00333; WO 93/08221; WO 93/08199; WO 94/01471; WO 96/20233; WO 97/15582; WO 97/19959; WO 97/46567; WO 98/01455; WO 98/06759; and WO 98/011144. Furthermore, metallocene catalyst compounds may contain one or more leaving group(s) bonded to the transition metal atom. For the purposes of this patent specification and appended claims the term "leaving group" may refer to one or more chemical moieties, such as a ligand, bound to the center metal atom of a catalyst component that can be abstracted from the catalyst component by an activator or cocatalyst, thus producing a catalyst species active toward olefin polymerization or oligomerization.

The Cp ligands are generally represented by one or more bonding systems comprising n bonds that can be open systems or ring systems or fused system(s) or a combination thereof. These ring(s) or ring system(s) are typically composed of atoms selected from Groups 13 to 16 atoms, preferably the atoms are selected from the group consisting of carbon, nitrogen, oxygen, silicon, sulfur, phosphorous, boron and aluminum or a combination thereof. Alternatively, the ring(s) or ring system(s) may be composed of carbon atoms such as, but not limited to, those cyclopentadienyl ligands or cyclopentadienyl-type ligand structures (structures isolobal to cyclopentadienyl). The metal atom may be selected from Groups 3 through 16 and the lanthanide or actinide series of the Periodic Table of Elements, and selected from Groups 4 through 12 in another embodiment, and selected from Groups 4, 5 and 6 in yet a more particular embodiment, and selected from Group 4 atoms in yet another embodiment.

In one or more embodiments, metallocene catalyst compounds are represented by the formula:

$$L^A L^B MQ_n \qquad (I)$$

where each $L^A$ and $L^B$ are bound to the metal atom (M), and each Q is bound to the metal center, n being 0 or an integer from 1 to 4, alternatively 1 or 2, and in another embodiment 2. In formula (I), M is a metal from the Periodic Table of the Elements and may be a Group 3 to 12 atom or a metal from the lanthanide or actinide series Group atom in one embodiment; selected from the group consisting of Sc, Ti, Zr, Hf, V, Nb, Ta, Mn, Re, Fe, Ru, Os, Co, Rh, Ir, and Ni in another embodiment; and selected from the group consisting of Groups 4, 5 or 6 transition metal in yet another embodiment. In one or more embodiments, M is a transition metal from Group 4 such as Ti, Zr or Hf; selected from the group of Zr and Hf in another embodiment; and Zr in yet a more particular embodiment. The oxidation state of M may range from 0 to +7 in one embodiment; and in another embodiment, is +1, +2, +3, +4 or +5; and in yet another illustrative embodiment is +2, +3 or +4. The groups bound to M are such that the compounds described below in the formulas and structures are electrically neutral, unless otherwise indicated. The Cp ligand(s) form at least one chemical bond with the metal atom M to form a metallocene catalyst compound. The Cp ligands are distinct from the leaving groups bound to the catalyst compound in that they are not highly susceptible to substitution/abstraction reactions.

The $L^A$ and $L^B$ groups of formula (I) are Cp ligands, such as cycloalkadienyl ligands and heterocylic analogues. The Cp ligands typically comprise atoms selected from the group consisting of Groups 13 to 16 atoms, and more particularly, the atoms that make up the Cp ligands are selected from the group consisting of carbon, nitrogen, oxygen, silicon, sulfur, phosphorous, germanium, boron and aluminum and combinations thereof, wherein carbon makes up at least 50% of the ring members. Also, $L^A$ and $L^B$ may be any other ligand structure capable of η-5 bonding to M and alternatively, $L^A$ and $L^B$ may comprise one or more heteroatoms, for example, nitrogen, silicon, boron, germanium, and phosphorous, in combination with carbon atoms to form a cyclic structure, for example, a heterocyclopentadienyl ancillary ligand. Furthermore, each of $L^A$ and $L^B$ may also be other types of ligands including but not limited to amides, phosphides, alkoxides, aryloxides, imides, carbolides, borollides, porphyrins, phthalocyanines, corrins and other polyazomacrocycles. Each $L^A$ and $L^B$ may be the same or different type of ligand that is π-bonded to M. Even more particularly, the Cp ligand(s) are selected from the group consisting of substituted and unsubstituted cyclopentadienyl ligands and ligands isolobal to cyclopentadienyl, non-limiting examples of which include cyclopentadienyl, indenyl, fluorenyl and other structures. Further illustrative ligands can include cyclopentaphenanthreneyl, benzindenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7-H-dibenzofluorenyl, indeno[1,2-9]anthrene, thiophenoindenyl, thiophenofluorenyl, hydrogenated versions thereof (e.g., 4,5,6,7-tetrahydroindenyl, or "H4Ind"), substituted versions thereof (as described in more detail below), heterocyclic versions thereof and the like, including hydrogenated versions thereof.

Each $L^A$ and $L^B$ can be unsubstituted or substituted with a combination of substituent R groups. Non-limiting examples of substituent R groups include one or more from the group selected from hydrogen, or linear, branched, alkyl radicals or cyclic alkyl radicals, alkenyl, alkynyl or aryl radicals or combination thereof, halogens and the like, including all their isomers, for example tertiary butyl and iso-propyl. In one or more embodiments, substituent R groups can include from 1 to 30 carbon atoms or other substituents having up to 50 non-hydrogen atoms that can each be substituted with halogens or heteroatoms or the like. Alkyl or aryl substituent R groups may include, but are not limited to, methyl, ethyl, propyl, butyl, pentyl, hexyl, cyclopentyl, cyclohexyl, benzyl or phenyl groups and the like, including all their isomers, for example, tertiary butyl, isopropyl, and the like. Halogenated hydrocarbyl radicals may include fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)-silyl, methyl-bis(difluoromethyl)silyl, bromomethyldimethylgermyl and the like; and disubstituted boron radicals including dimethylboron for example; and disubstituted pnictogen or Group 15-containing radicals including dimethylamine, dimethylphosphine, diphenylamine, methylphenylphosphine; and chalcogen or Group 16-containing radicals including methoxy, ethoxy, propoxy, phenoxy, methylsulfide, ethylsulfide and the like. Non-hydrogen substituent R groups may include the atoms carbon, silicon, boron, aluminum, nitrogen, phosphorous, oxygen, tin, germanium and the like including olefins such as but not limited to olefinically unsaturated substituents including vinyl-terminated ligands, for example, but-3-enyl, prop-2-enyl, hex-5-enyl, 2-vinyl, or 1-hexene. Also, at least two R groups, preferably two adjacent R groups may be joined to form a ring structure having from 3 to 30 atoms selected from carbon, nitrogen, oxygen, phosphorous, silicon, germanium, boron or a combination thereof. Also, an R group such as 1-butanyl may form a bond to the metal M.

The leaving groups Q of formula (I) are monoanionic labile ligands bound to M. Depending on the oxidation state of M, the value for n is 0, 1 or 2 such that formula (I) above represents a neutral metallocene catalyst compound, or a positively charged compound. In one or more embodiments, Q may comprise weak bases such as, but not limited to, alkyls, alkoxides, amines, alkylamines, phosphines, alkylphosphines, ethers, carboxylates, dienes, hydrocarbyl radicals having from 1 to 20 carbon atoms, $C_6$ to $C_{12}$ aryls, $C_7$ to $C_{20}$ alkylaryls, $C_7$ to $C_{20}$ arylalkyls, hydrides or halogen atoms (e.g., Cl, Br or I) and the like, and combinations thereof. Other examples of Q radicals include those substituents for R as described above and including cyclohexyl, heptyl, tolyl, trifluoromethyl, tetramethylene and pentamethylene, methylidene, methyoxy, ethyoxy, propoxy, phenoxy, bis(N-methylanilide), dimethylamide, dimethylphosphide radicals and the like.

In addition, metallocene catalyst compounds include those of formula (I) where $L^A$ and $L^B$ are bridged to each other by a bridging group, A. These bridged compounds are known as bridged, metallocene catalyst compounds represented by the formula (II):

$$L^A(A)L^B MQ_n \qquad (II)$$

where each $L^A$ and $L^B$ are bound to the metal center M, and each Q is bound to the metal center, n being 0 or an integer from 1 to 4, alternatively 1 or 2, and in another embodiment 2; the groups $L^A$, $L^B$ M and Q are as defined in formula (I); and the divalent bridging group A is bound to both $L^A$ and $L^B$ through at least one bond or divalent moiety, each.

Non-limiting examples of bridging group A from formula (II) include divalent bridging groups containing at least one Group 13 to 16 atom. In one or more embodiments, the bridging group A may be referred to as a divalent moiety such as, but not limited to, carbon, oxygen, nitrogen, silicon, germanium and tin or a combination thereof. In one or more embodiments, bridging group A contains carbon, silicon or germanium atom and in yet another illustrative embodiment, A contains at least one silicon atom or at least one carbon atom. Other non-limiting examples of bridging groups A can be represented by R'$_2$C=, R'$_2$Si=, —(R')$_2$Si(R')$_2$Si—, —(R')$_2$Si(R')$_2$C—, R'$_2$Ge=, —(R')$_2$Si(R')$_2$Ge—, —(R')$_2$Ge (R')$_2$C—, R'N=, R'P=, —(R')$_2$C(R')N—, —(R')$_2$C(R')P—, —(R')$_2$Si(R')N—, —(R')$_2$Si(R')P—, —(R')$_2$Ge(R')N—, —(R')$_2$Ge(R')P—, where R' is independently, a radical group which is hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atom, substituted Group 16 atom, or halogen; or two or more R' groups may be joined to form a ring or ring system; and independently, each Q can be a hydride, substituted or unsubstituted, linear, cyclic or branched, hydrocarbyl having from 1 to 30 carbon atoms, halogen, alkoxides, aryloxides, amides, phosphides, or any other univalent anionic ligand or combination thereof.

In one or more embodiments, the metallocene catalysts include their structural or optical or enantiomeric isomers (meso and racemic isomers) and mixtures thereof. In one or more embodiments, the metallocene compounds can be chiral and/or a bridged metallocene catalyst compound. Further, as used herein, a single, bridged, asymmetrically substituted metallocene catalyst component having a racemic and/or meso isomer does not, itself, constitute at least two different bridged, metallocene catalyst components.

Group 15 Atom and Metal Containing Catalysts

The use of "Group 15 atom and metal containing" catalyst components either alone or for use with a metallocene or other olefin polymerization catalyst component can be used. Generally, Group 15 atom and metal containing catalyst components may include complexes of Group 3 to 12 metal atoms, wherein the metal atom is 2 to 8 coordinate, the coordinating moiety or moieties including at least two Group 15 atoms, and up to four Group 15 atoms. In one or more embodiments, the Group 15 atom and metal containing catalyst component is a complex of a Group 4 metal and from one to four ligands such that the Group 4 metal is at least 2 coordinate, the coordinating moiety or moieties including at least two nitrogens. Representative Group 15 atom and metal containing compounds are disclosed in, for example, PCT Publication WO 99/01460; EP 0 893 454; EP 0 894 005; and U.S. Pat. Nos. 5,318,935; 5,889,128; 6,333,389; and 6,271,325.

In one or more embodiments, the Group 15 atom and metal containing compounds may include Group 4 imino-phenol complexes, Group 4 bis(amide) complexes, and Group 4 pyridyl-amide complexes that are active towards olefin polymerization to any extent. In one possible embodiment, the Group 15 atom and metal containing compounds may include a bisamide compound such as [(2,3,4,5,6 Me$_5$C$_6$)NCH$_2$CH$_2$]$_2$ NHZrBz$_2$, also known as Bis(phenylmethyl) [N'-(2,3,4,5,6-pentamethylphenyl)-N-[2-[(2,3,4,5,6-pentamethylphenyl)amino-kN]ethyl]-1,2-ethanediaminato(2-)kN,kN']zirconium (from Boulder Chemical).

Mixed Catalysts

In one or more embodiments, one type of catalyst compound described above can be combined with one or more other types of catalyst compounds described herein to provide a, mixed catalyst system. For example, see U.S. Pat. Nos. 4,937,299; 4,935,474; 5,281,679; 5,359,015; 5,470,811; and 5,719,241.

In one or more embodiments, one or more metallocene catalyst compounds or catalyst systems can be used in combination with one or more conventional-type catalyst compounds or catalyst systems. Non-limiting examples of mixed catalysts and catalyst systems are described in, for example, U.S. Pat. Nos. 4,159,965; 4,325,837; 4,701,432; 5,124,418; 5,077,255; 5,183,867; 5,391,660; 5,395,810; 5,691,264; 5,723,399; and 5,767,031; and PCT Publication WO 96/23010.

In one or more embodiments, two or more conventional-type transition metal catalysts can be combined with one or more conventional-type cocatalysts. Non-limiting examples of mixed conventional-type transition metal catalysts are described in, for example, U.S. Pat. Nos. 4,154,701; 4,210,559; 4,263,422; 4,672,096; 4,918,038; 5,198,400; 5,237,025; 5,408,015; and 5,420,090.

Activators and Activation Methods for Catalyst Compounds

As used herein, the term "activator" can include any combination of reagents that increases the rate at which a transition metal compound oligomerizes or polymerizes unsaturated monomers, such as olefins. An activator can also affect the molecular weight, degree of branching, comonomer content, or other properties of the oligomer or polymer. The transition metal compounds can be activated for oligomerization and/or polymerization catalysis in any manner sufficient to allow coordination or cationic oligomerization and or polymerization.

In one or more embodiments, alumoxane activators can be utilized as an activator for one or more of the catalyst compositions. Alumoxane(s) or aluminoxane(s) are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208; 4,952,540; 5,041,584; 5,091,352; 5,206,199; 5,204,419; 4,874,734; 4,924,018; 4,908,463; 4,968,827; 5,329,032; 5,248,801; 5,235,081; 5,157,137; 5,103,031; and EP 0 561 476; EP 0 279 586; EP 0 516 476; EP 0 594 218; and PCT Publication WO 94/10180.

When the activator is an alumoxane (modified or unmodified), some embodiments select the maximum amount of activator at a 5000-fold molar excess Al/M over the catalyst precursor (per metal catalytic site). Other embodiments select the minimum amount of activator-to-catalyst-precursor at a 1:1 molar ratio.

Aluminum alkyl or organoaluminum compounds which may be utilized as activators (or scavengers) include trimethylaluminum, triethylaluminum, triisobutylaluminum, tri-n-hexylaluminum, tri-n-octylaluminum and the like.

Supports

The catalyst compositions can include a support material or carrier. For example, the one or more catalyst components and/or one or more activators may be deposited on, contacted with, vaporized with, bonded to, or incorporated within, adsorbed or absorbed in, or on, one or more supports or carriers. Thus, the above described metallocene catalyst compounds and catalyst systems as well as conventional-type transition metal catalyst compounds and catalyst systems may be combined with one or more support materials or carriers using one of the support methods well known in the art or as described below. For example, a metallocene catalyst compound or catalyst system is in a supported form, for example, deposited on, contacted with, or incorporated within, adsorbed or absorbed in, or on, a support or carrier.

As used herein, the terms "support" and "carrier" are used interchangeably and are any support material, including a porous support material, for example, talc, inorganic oxides, and inorganic chlorides. Other carriers include resinous support materials such as polystyrene, functionalized or crosslinked organic supports, such as polystyrene divinyl benzene polyolefins or other polymeric compounds, or any other organic or inorganic support material and the like, or mixtures thereof.

The support material is any of the conventional support materials. The supported material may be a porous support material, for example, talc, inorganic oxides and inorganic chlorides. Other support materials may include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

Illustrative support materials such as inorganic oxides include Group 2, 3, 4, 5, 13 or 14 metal oxides. The preferred supports include silica, which may or may not be dehydrated, fumed silica, alumina (see, for example, PCT Publication WO 99/60033), silica-alumina and mixtures thereof. Other useful supports include magnesia, titania, zirconia, magnesium chloride (U.S. Pat. No. 5,965,477), montmorillonite (EP 0 511 665), phyllosilicate, zeolites, talc, clays (U.S. Pat. No. 6,034,187), and the like. Also, combinations of these support materials may be used, for example, silica-chromium, silica-alumina, silica-titania and the like. Additional support materials may include those porous acrylic polymers described in EP 0 767 184, which is incorporated herein by reference. Other support materials include nanocomposites as disclosed in PCT Publication WO 99/47598; aerogels as disclosed in PCT Publication WO 99/48605; spherulites as disclosed in U.S. Pat. No. 5,972,510; and polymeric beads as disclosed in PCT Publication WO 99/50311.

The support material, such as an inorganic oxide, can have a surface area in the range of from about 10 m$^2$/g to about 700 m$^2$/g, pore volume in the range of from about 0.1 cm$^3$/g to about 4.0 cm$^3$/g and average particle size in the range of from about 5 µm to about 500 µm. More preferably, the surface area of the support material can be in the range of from about 50 m$^2$/g to about 500 m$^2$/g, pore volume of from about 0.5 cm$^3$/g to about 3.5 cm$^3$/g and average particle size of from about 10 µm to about 200 µm. Most preferably the surface area of the support material can be in the range is from about 100 m$^2$/g to about 400 m$^2$/g, pore volume from about 0.8 cm$^3$/g to about 3.0 cm$^3$/g and average particle size is from about 5 µm to about 100 µm. The average pore size of the carrier typically has pore size in the range of from about 10 Å to about 1,000 Å, alternatively from about 50 Å to about 500 Å, and in some embodiments from about 75 Å to about 350 Å.

In one embodiment, the metallocene catalyst compounds can be supported on the same or separate supports together with an activator, or the activator may be used in an unsupported form, or may be deposited on a support different from the supported metallocene catalyst compounds, or any combination thereof. This may be accomplished by any technique commonly used in the art.

There are various other methods in the art for supporting a polymerization catalyst compound or catalyst system. For example, the metallocene catalyst compounds can contain a polymer bound ligand as described in, for example, U.S. Pat. Nos. 5,473,202 and 5,770,755. The metallocene catalyst compounds can be spray dried as described in, for example, U.S. Pat. No. 5,648,310. The support used with the metallocene catalyst compounds can be functionalized, as described in EP 0 802 203, or at least one substituent or leaving group is selected as described in U.S. Pat. No. 5,688,880.

End Uses

The bimodal polyethylene compositions can be used in a wide variety of products and end-use applications. The bimodal polyethylene compositions can also be blended and/or coextruded with any other polymer. Non-limiting examples of other polymers include linear low density polyethylenes, elastomers, plastomers, high pressure low density polyethylene, high density polyethylenes, polypropylenes and the like.

The bimodal polyethylene compositions and blends thereof are useful in forming operations such as film, sheet, and fiber extrusion and co-extrusion as well as blow molding, injection molding and rotary molding. Films can include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers can include melt spinning, solution spinning and melt blown fiber operations for use in woven or non-woven form to make filters, diaper fabrics, medical garments, geotextiles, etc. Extruded articles can include medical tubing, wire and cable coatings, pipe, geomembranes, and pond liners. Molded articles can include single and multi-layered constructions in the form of bottles, tanks, large hollow articles, rigid food containers and toys, etc.

EXAMPLES

To provide a better understanding of the foregoing discussion, the following non-limiting examples are provided. Although the examples may be directed to specific embodiments, they are not to be viewed as limiting the invention in any specific respect. All parts, proportions and percentages are by weight unless otherwise indicated.

In Examples 1-3 and the comparative example (C1), the catalyst system used to produce the starting or base resin (i.e. prior to tailoring) was prepared by mixing 6.90 g (0.017 mol) of bis(n-butyl cyclopentadienyl) zirconium dichloride, supplied by Boulder Scientific Company and 62.6 grams (0.094 mol) of [(2,3,4,5,6-Me$_5$C$_6$)NCH$_2$CH$_2$]$_2$NHZrBz$_2$ with 11.6 kg (19.7 mol of MAO) of a 10% solution by weight of MAO in toluene, 16.8 kg of toluene, and with 1.6 kg of treated fumed silica (Cabosil TS-610). The bis(n-butyl cyclopentadienyl) zirconium dichloride, [(2,3,4,5,6-Me$_5$C$_6$)NCH$_2$CH$_2$]$_2$ NHZrBz$_2$, MAO in toluene solution, and treated fumed silica were introduced into an atomizing device, producing droplets that were contacted with a gas stream to evaporate the liquid, thereby forming a powder. The actual yield was about 2.8 kg. The resulting powder was then mixed with hydrobite 380 PO white mineral oil purchased from Sonneborn and hexane to obtain a catalyst slurry that contained 22 wt % solid catalyst. The mole ratio of [(2,3,4,5,6-Me$_5$C$_6$)NCH$_2$CH$_2$]$_2$NHZrBz$_2$ to bis(n-butyl cyclopentadienyl) zirconium dichloride of the final catalyst composition was 5.5 to 1.0.

The resin used for Examples 1-3 and the comparative example "C1" was a bimodal HDPE resin produced in a fluidized bed reactor using the catalyst system discussed above. The comparative example C1 was dry blended with 0.05 wt % Irganox 1010 and 0.05 wt % Irgafos 168. The dry blended sample was introduced to a Kobe Steel LCM-100 mixer equipped with an EL-2 rotor, under a nitrogen blanket and melt-homogenized. Pellets from the melt-homogenized sample of comparative example C1 were then evaluated.

In Example 1, 0.05 wt % Irganox 1010 and 0.05 wt % Irgafos 168 were added to the granular resin feed prior to introduction to a Kobe Steel LCM-100 mixer equipped with an EL-2 rotor. Oxygen was introduced at two locations, the feed hopper and downstream of the gate, as a purified oxygen-nitrogen mixture containing 15 vol % oxygen concentration. Total gas flow was maintained at 0.8 Nm$^3$/hr. The gate position, and thus the specific energy input (SEI), was adjusted to maintain the temperature in a constant range at the gate, which was a temperature of 265° C. Specific energy input (SEI) refers to the energy input to the main drive of the extruder, per unit weight of melt processed resin, and is expressed in units of hphr/lb or kWhr/kg. Pellets from the oxygen tailored sample of Example 1 were then evaluated.

In Example 2, 0.05 wt % Irganox 1010 and 0.05 wt % Irgafos 168 were added to the granular resin feed prior to introduction to the Kobe Steel LCM-100 mixer. Oxygen was introduced at two locations, the feed hopper and downstream of the gate, as a purified oxygen-nitrogen mixture having a 10 vol % oxygen concentration. Total gas flow was maintained at 0.8 Nm$^3$/hr. The gate position, and thus the SEI, was adjusted to maintain the temperature in a constant range at the gate, which was a temperature of 255° C. Pellets from the oxygen tailored sample of Example 2 were then evaluated.

In Example 3, 0.05 wt % Irganox 1010 was added to the granular resin feed prior to introduction to the Kobe Steel LCM-100 mixer. The addition of Irgafos 168 (a phosphite containing additive) was eliminated. Oxygen was introduced at two locations, the feed hopper and downstream of the gate, as a purified oxygen-nitrogen mixture having a 10 vol % oxygen concentration. Total gas flow was maintained at 0.8 Nm$^3$/hr. The gate position, and thus the SEI, was adjusted to maintain the temperature in a constant range at the gate, which was a temperature of 255° C. Pellets from the oxygen tailored sample of Example 3 were then evaluated.

Table 1 shows selected properties of the three oxygen tailored samples (Examples 1-3) and the non-tailored, comparative sample (C1).

TABLE 1

|  | Ex. 1 | Ex. 2 | Ex. 3 | C1 |
| --- | --- | --- | --- | --- |
| C6/C2 Ratio | 0.0011 | 0.0011 | 0.0011 | 0.0011 |
| FI (I$_{21}$) (g/10 min) | 31.32 | 32.58 | 25.81 | 22.26 |
| MFR (I$_{21}$/I$_2$) | 289 | 269 | 358 | 265 |
| Density (g/cm3) | 0.9581 | 0.957 | 0.9576 | 0.9576 |
| Roch. Bottle Weight | 74.6 | 76.2 | 70.5 | 76.8 |
| Percent Die Swell | 78.7 | 79.4 | 76.7 | 80.3 |
| n CLS | 10.4 | 13.7 | 12.4 | 24.3 |
| ESCR (hours) | 173 | 222 | 197 | 381 |
| Tailoring | Yes | Yes | Yes | No |
| Oxygen (% by volume) | 15 | 10 | 10 |  |
| Additives | 0.05% Irganox 1010 0.05% Irgafos 168 | 0.05% Irganox 1010 0.05% Irgafos 168 | 0.05% Irganox 1010 | 0.05% Irganox 1010 0.05% Irgafos 168 |
| Temperature (° C.) | 265 | 255 | 255 |  |
| G'/G" @ 0.1 Rad/sec | 0.931432 | 0.842301 | 1.164359 | 0.727738 |
| ΔG'/G" | 0.28 | 0.16 | 0.6 |  |
| Mn | 10,287 | 9,507 | 10,589 | 12,137 |
| Mw | 309,790 | 328,131 | 287,445 | 335,163 |
| Mz | 2,425,141 | 2,794,403 | 2,249,363 | 2,345,053 |
| Mz + 1 | 4,319,271 | 5,311,698 | 4,036,681 | 4,358,933 |
| Mw/Mn | 30.1 | 34.5 | 27.1 | 27.6 |
| Mw of the LMWC | 33,501 | 31,608 | 34,698 | 34,729 |
| Mw of the HMWC | 860,015 | 824,678 | 826,557 | 850,827 |
| % HMWC | 33 | 36 | 32 | 36 |

Table 2 shows specific tests used to determine certain properties of the polyethylene compositions.

TABLE 2

| Property | Test Procedure |
| --- | --- |
| FI (I21) (g/10 min) | ASTM D-1238-F |
| MFR (I21/I2) | I21: ASTM D-1238-F |
|  | I2: ASTM D-1238-E |
| Density (g/cm3) | ASTM D-792 |
| n CLS | ASTM F2136 -08, at 1200 psi* |
| ESCR (hours) | ASTM D-1693, Procedure B, reported as F50 hours |
| G'/G" @ 0.1 Rad/sec | ASTM D-4440-84 |
| Die Swell | See below. |
| Roche Bottle Weight | See below. |

*The nCLS was determined using ASTM F2136 - 08, at 1,200 psi. The pressure was increased from the recommended 600 psi to 1,200 psi in order to reduce the failure time and to speed up the overall time required for the test.

The percent die swell (% DS) is defined by $(D/D_o-1) \times 100$, where $D_o$ is the diameter of the die (1 mm) and D is the average diameter of the extruded rod calculated by the equation: $D=20*[t*0.075/(15.24*\pi*0.7693)]^{0.5}$. Time (t) equals the time, in seconds, required to extrude a polymer rod having a length of 15.24 cm.

In the examples provided herein, the bimodal polyethylene compositions were extruded at a temperature of 190° C. and at a shear rate of 997.2 s$^{-1}$. The bimodal polyethylene compositions were passed at a constant rate through a capillary die 20 mm in length and 1 mm in diameter.

The bottle weight (Roch. Bottle Weight) was determined with a Rocheleau R4 blow molding machine and a conical bottle mold. The bottle weight test estimates the swell characteristics of polymer compositions with respect to a control polymer. The control polymer was UNIVAL™ DMDA-6200 NT7, available from Dow Chemical Company. The following procedure was used for the start-up and operation of the Rocheleau blow molding machine and the bottle weight determination test. Standard operating conditions for proper temperatures and cycle times was used. Specifically, an operating temperature of 182° C. (360° F.) and a screw speed of 200 rotations per minute (RPM) were used. The parison to length of the mold was adjusted 33 cm (13 inches). The parison formation time (PFT) was adjusted to 2.0 seconds, which is the total time in which the parison is extruded. The control polymer was used to set the Rocheleau blow molding machine operating conditions to provide the desired control sample. The tail length was adjusted so that a uniform molten bead of polymer was present. The tail weighed between 21 and 23 grams. Obtaining a consistent tail length from sample to sample is important for estimating consistent bottle weights. A shorter tail, without a uniform bead of molten polymer, will result in a heavier bottle. A shorter tail results in less sag on the parison, so that when the mold is closed around the parison, the walls of the parison blown within the mold cavity will be thicker. A longer tail will create a lighter bottle and the extra weight will draw down the parison making the area of the bottle wall thinner that is enclosed by the mold. The molded article includes three separate areas, namely, top flashing that runs down a parting line of the mold, bottom flashing or tail, and the blow molded bottle. Twenty bottles were formed before acquiring the weight of a trimmed bottle. The trimmed bottle weight should be between 70 and 75 grams, and preferably between 72 and 73 grams. The die gap was adjusted to bring the bottle weight into this range. Once the operating conditions consistently produce control samples falling between 70 and 75 grams the experimental polymers were then introduced to the blow molding machine. The die gap is not adjusted once it is set to produce bottles made using the control sample. Twelve untrimmed bottles were periodically acquired for measurement. The following machine conditions were recorded: the temperature of the barrel, melt temperature, melt pressure, PFT, and shot length. For ten bottles the total untrimmed bottle weight or parison weight (Pw) in grams and bottle trim weight were recorded and then the average for both the untrimmed and trimmed bottle weights were calculated. For each sample tested ten samples were measured with the averages being the value reported.

As shown in Table 1, Examples 1-3 all exhibited an increased elasticity (G'/G") as compared to that of the comparative example C1. The ESCR of Examples 1-3 ranged from 173 hours to 222 hours, and was significantly reduced compared to the comparative example C1, which was 381 hours.

Surprisingly, however, the combination of the ESCR values and the increase elasticity (G'/G") provided a balance between the two properties that produces a bimodal high density polyethylene resin suitable for blow molding applications. High ESCR products are generally difficult to process due to die swell not being optimal. Increasing the G'/G" reduces the die swell to a preferred range, e.g. less than 80%, while still maintaining a high level of ESCR.

In Example 3, the exclusion of Irgafos 168 provided an exemplary polyethylene product having an excellent balance between the ESCR and increase in elasticity (G'/G") (ESCR of 197 hours and an increase in elasticity (G'/G") of 60% as compared to the comparative example (C1). Not wishing to be bound by theory, it is believed that the exclusion of Irgafos 168, a phosphate, contributed to the further increase in elasticity (G'/G") as compared to Examples 1 and 2.

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

Only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

All numerical values are "about" or "approximately" the indicated value, and take into account experimental error and variations that would be expected by a person having ordinary skill in the art.

All documents cited herein are fully incorporated by reference for all jurisdictions in which such incorporation is permitted and to the extent such disclosure is consistent with the description of the present invention. While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A method for making a bimodal polyethylene composition, comprising:
   polymerizing ethylene and a comonomer in the presence of a mixed catalyst comprising at least one Group-15 containing catalyst in a gas phase polymerization reactor to produce a bimodal polyethylene;
   heating the bimodal polyethylene to produce a substantially melted bimodal polyethylene;
   contacting the substantially melted bimodal polyethylene with a gas mixture comprising from about 8 vol % to about 20 vol % oxygen to produce an oxygen tailored bimodal polyethylene, wherein during the oxygen tailoring the amount of phosphorous containing compounds present is less than 0.05 wt % based on the combined weight of the polyethylene resin and phosphorous containing compounds; and
   cooling the oxygen tailored bimodal polyethylene to produce a bimodal polyethylene composition comprising:

a high molecular weight component having a weight average molecular weight (Mw) of from about 500,000 to about 950,000;

a low molecular weight component having a weight average molecular weight (Mw) of from about 3,000 to about 100,000, wherein the high molecular weight component is present in an amount ranging from about 25 wt % to about 40 wt % of the bimodal polyethylene composition;

wherein the ratio of the weight average molecular weight of the high molecular weight component to the weight average molecular weight of the low molecular weight component is from about 15 to about 35;

a melt flow ratio ($I_{21}/I_2$) of equal to 200; and a percent die swell of less than about 80%.

2. The method of claim 1, wherein the substantially melted bimodal polyethylene is heated to a temperature of from about 240° C. to about 260° C.

3. The method of claim 1, wherein the bimodal polyethylene composition further comprises an elasticity (G'/G") of about 0.8 or more.

4. The method of claim 1, further comprising forming the bimodal polyethylene composition into a blow molded article.

5. A method for making a bimodal polyethylene composition, comprising:

polymerizing ethylene and a comonomer in the presence of a mixed catalyst comprising at least one Group-15 containing catalyst in a gas phase polymerization reactor to produce a bimodal polyethylene;

conveying the bimodal polyethylene through a mixer/extruder, wherein the mixer/extruder comprises a melt-conveying zone, and wherein the bimodal polyethylene is substantially melted in the melt-conveying zone; and contacting the substantially melted polyethylene with a gas mixture comprising from about 8 vol % oxygen to about 20 vol % oxygen within the melt-conveying zone, wherein during the oxygen tailoring the amount of phosphorous containing compounds present is less than 0.05 wt % based on the combined weight of the polyethylene resin and phosphorous containing compounds, to produce a bimodal polyethylene composition comprising:

a high molecular weight component having a weight average molecular weight (Mw) of from about 500,000 to about 950,000;

a low molecular weight component having a weight average molecular weight (Mw) of from about 3,000 to about 100,000, wherein the high molecular weight component is present in an amount ranging from about 25 wt % to about 40 wt % of the bimodal polyethylene composition, and wherein a ratio of the weight average molecular weight of the high molecular weight component to the weight average molecular weight of the low molecular weight component ranges from about 15 to about 35;

a melt flow ratio ($I_{21}/I_2$) of greater than or equal to 200; and a percent die swell of less than about 80%.

6. The method of claim 5, further comprising pelletizing the bimodal polyethylene composition to produce a pelletized polyethylene product.

7. The method of claim 6, further comprising forming the pelletized polyethylene product into a blow molded article.

8. The method of claim 5, wherein the bimodal polyethylene composition further comprises an elasticity (G'/G") of about 0.8 or more.

9. The method of claim 5, wherein the bimodal polyethylene composition further comprises a density of from about 0.95 g/cm$^3$ to about 0.97 g/cm$^3$.

10. The method of claim 5, wherein the bimodal polyethylene composition further comprises a flow index ($I_{21}$) of from about 20 g/10 min to about 40 g/10 min.

* * * * *